United States Patent [19]

Koch

[11] Patent Number: 4,788,566

[45] Date of Patent: Nov. 29, 1988

[54] PHOTOGRAPHIC CASSETTE FOR MANIPULATION AND EXPOSURE OF A LIGHT-SENSITIVE SHEET

[75] Inventor: Carl Koch, Stetten, Switzerland

[73] Assignee: Sinar AG Schaffhausen, Feuerthalen, Switzerland

[21] Appl. No.: 55,136

[22] Filed: May 28, 1987

[30] Foreign Application Priority Data

May 30, 1986 [CH] Switzerland ............... 2194/86
Sep. 3, 1986 [CH] Switzerland ............... 3559/86

[51] Int. Cl.⁴ .................. G03B 17/26; G03B 19/10
[52] U.S. Cl. ........................... 354/283; 354/174; 354/289.1
[58] Field of Search ............... 354/105, 174, 276, 283, 354/284, 285, 289.1

[56] References Cited

U.S. PATENT DOCUMENTS

| | | | |
|---|---|---|---|
| 4,456,358 | 6/1984 | Busch | 354/285 |
| 4,493,545 | 1/1985 | Bauer et al. | 354/284 |
| 4,592,634 | 6/1986 | Koch | 354/105 |
| 4,678,302 | 7/1987 | Koch | 354/283 |

Primary Examiner—A. A. Mathews

Attorney, Agent, or Firm—Watson, Cole, Grindle & Watson

[57] ABSTRACT

A cassette having a housing with an opening for the light to penetrate when exposing a film sheet, loaded into the cassette, and also for the entry and exit of the film sheet when loading and unloading the cassette. For gripping the edges of the film sheet, inserted into the cassette, there are movable retaining members, which can be moved into ineffective positions outside the contours of the opening of the housing, to facilitate the entry and exit of the film sheet in a direction perpendicular to its plane. When the retaining members are moved into their effective positions, a pressure plate under the influence of a spring forces the film sheet, to be loaded into the cassette, against the retaining members, whereby the film sheet is held planar. Externally accessible actuators interact in the manner of rams with both the pressure plate and the retaining members such that at times when moving the actuators from an inactive into an active position, the pressure plate is forced away from the retaining members and the retaining members are moved into their ineffective positions, and vice versa.

25 Claims, 15 Drawing Sheets

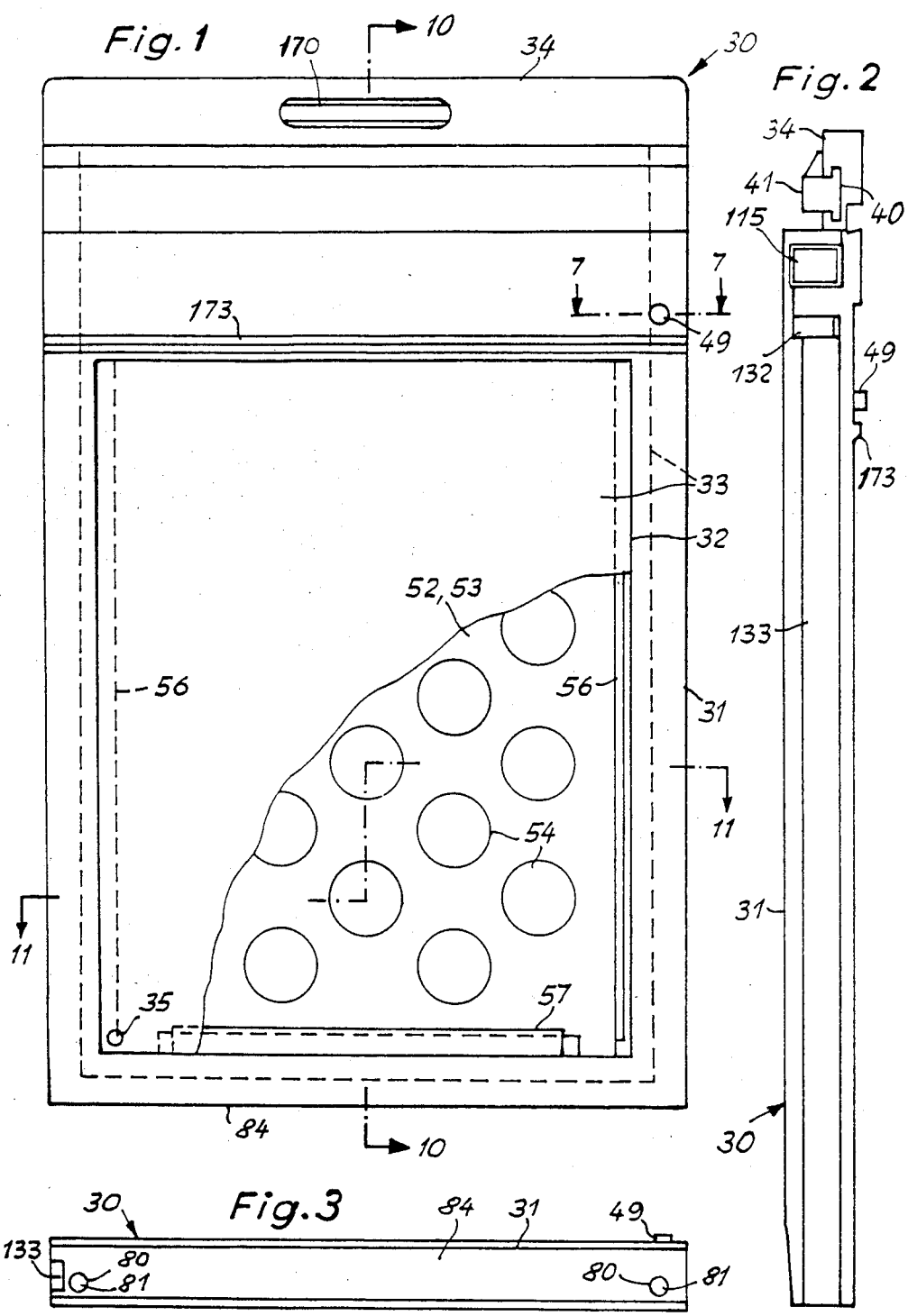

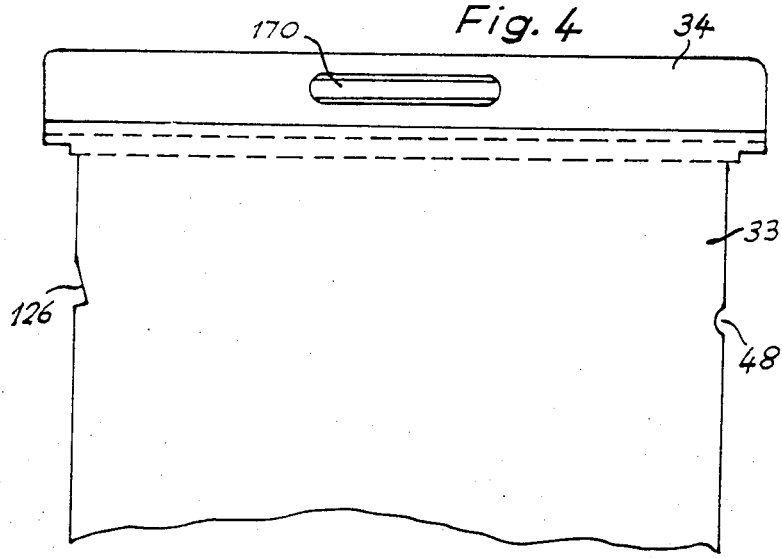
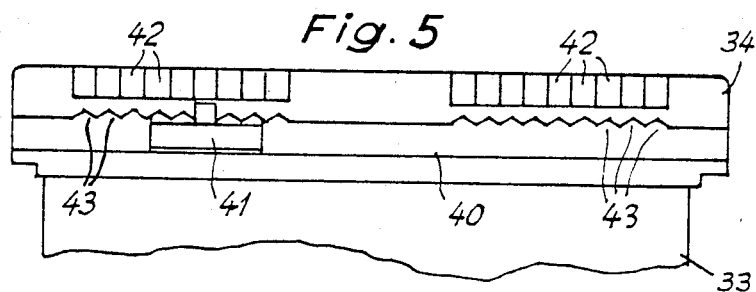
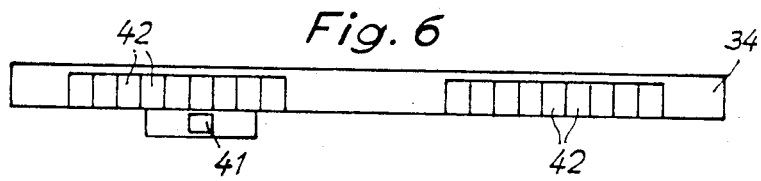
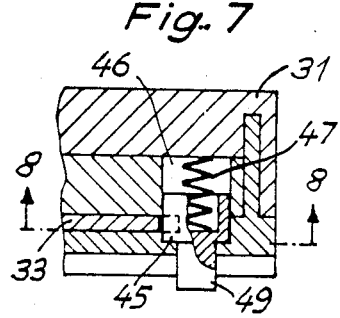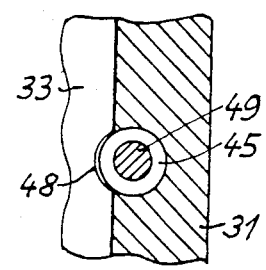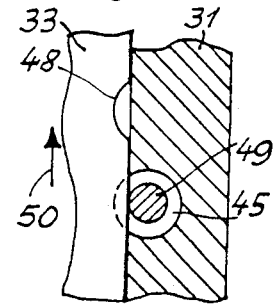

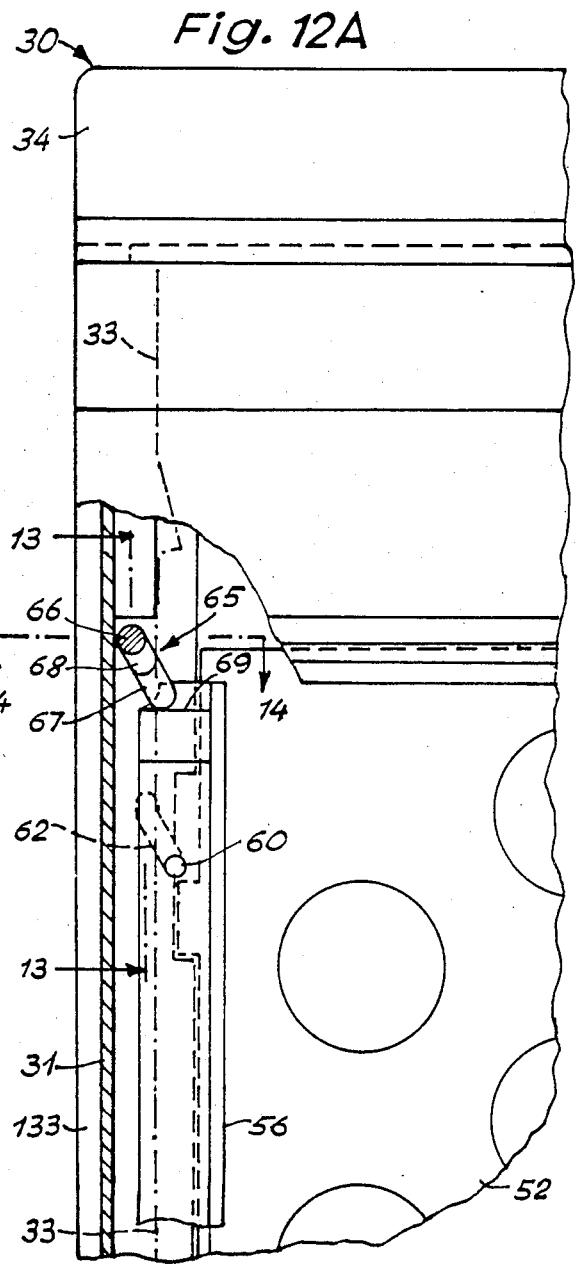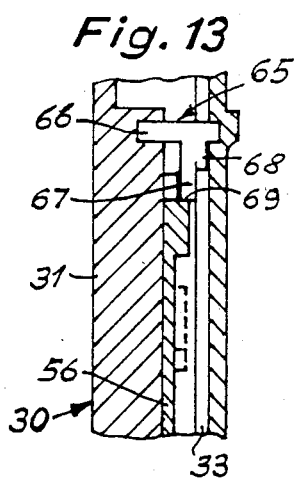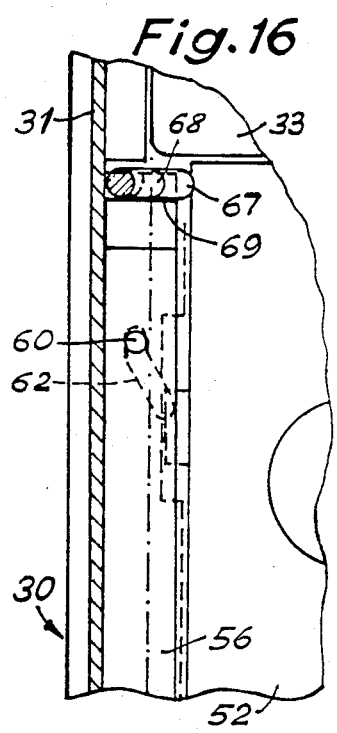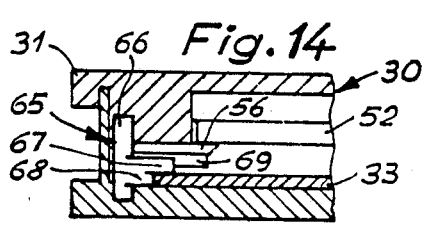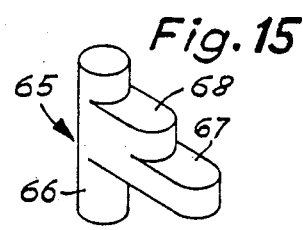

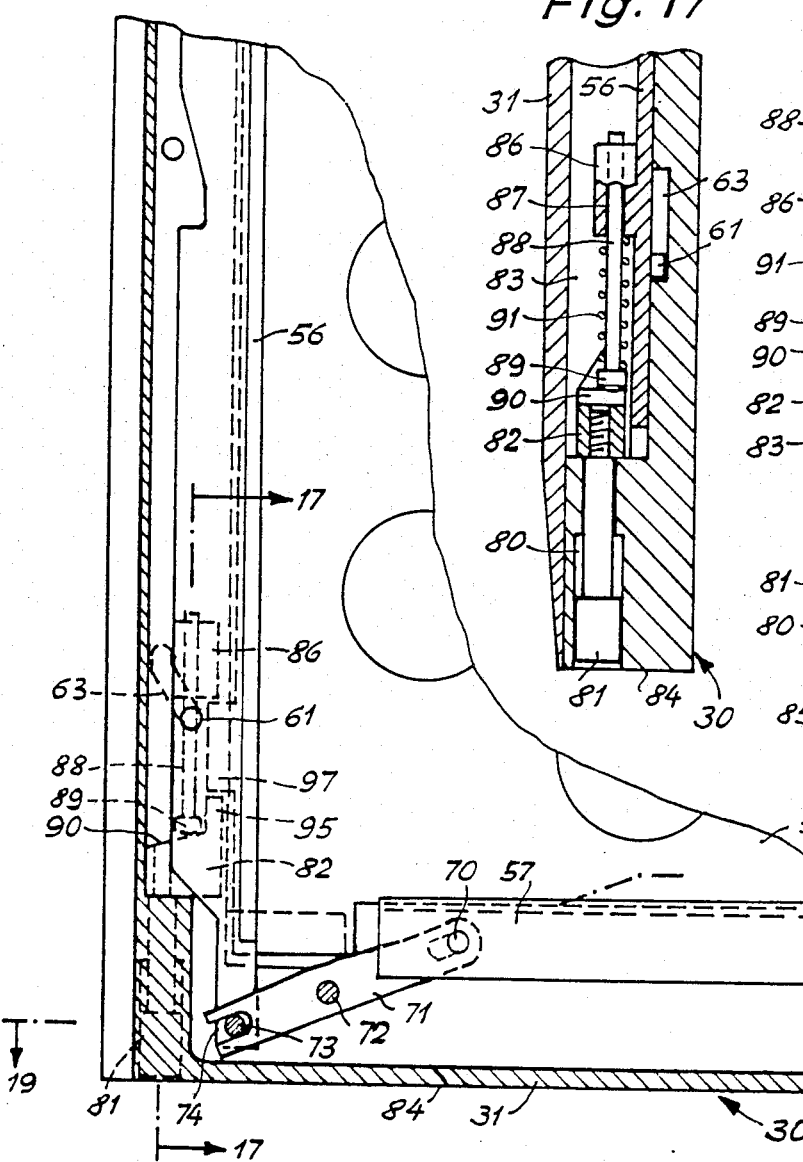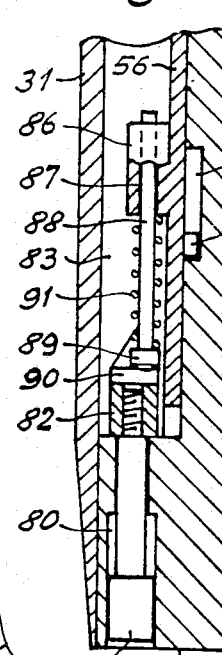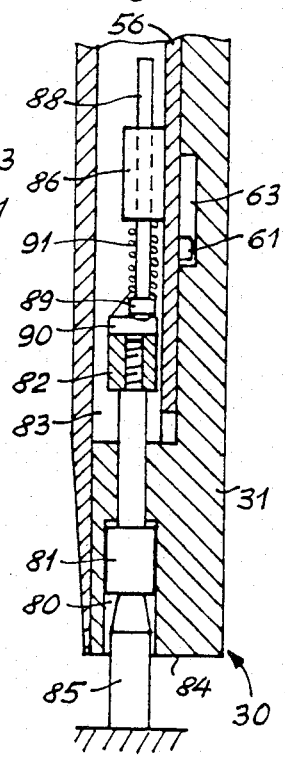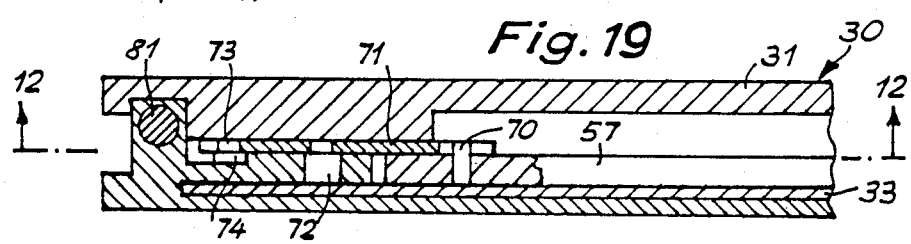

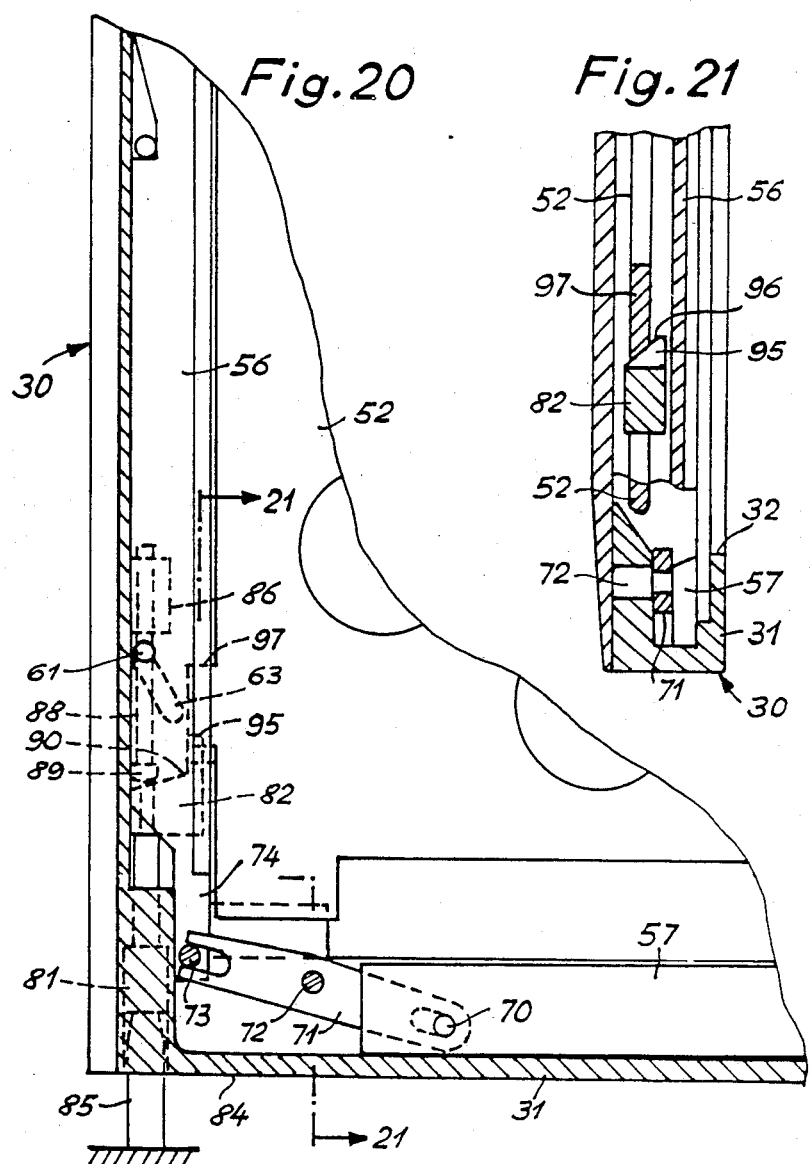
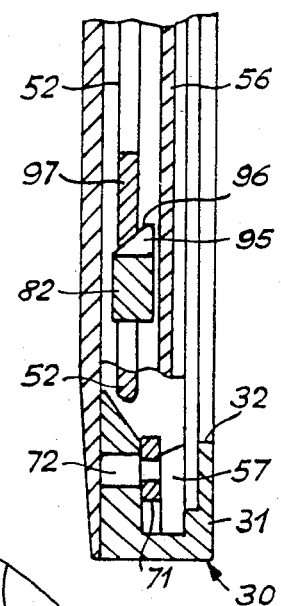
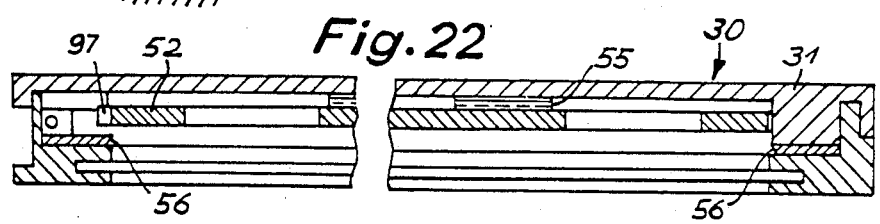

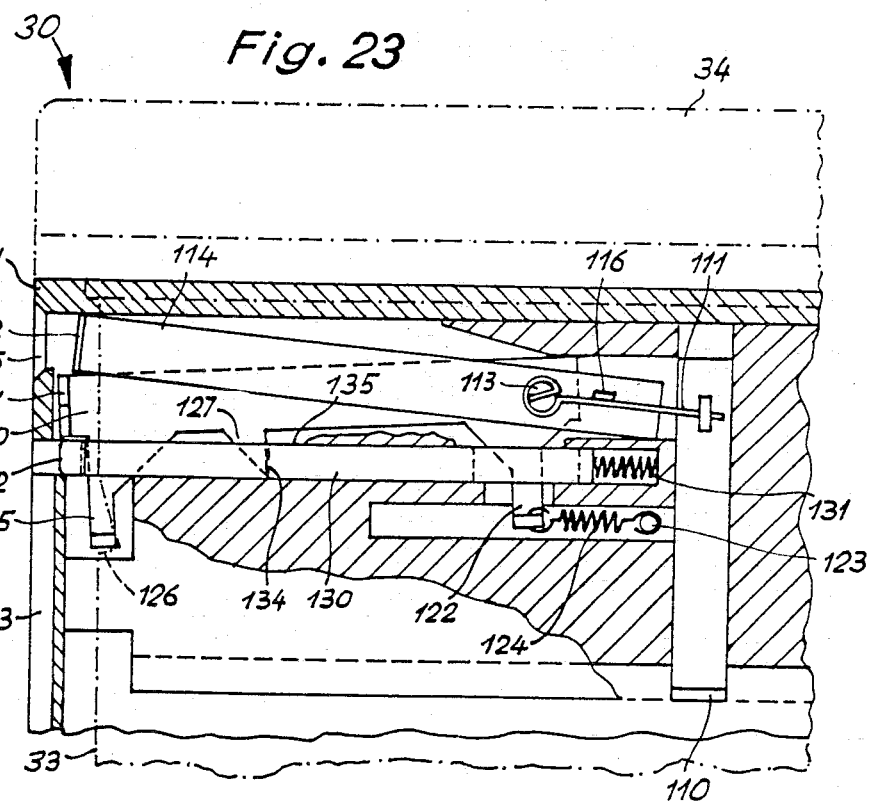
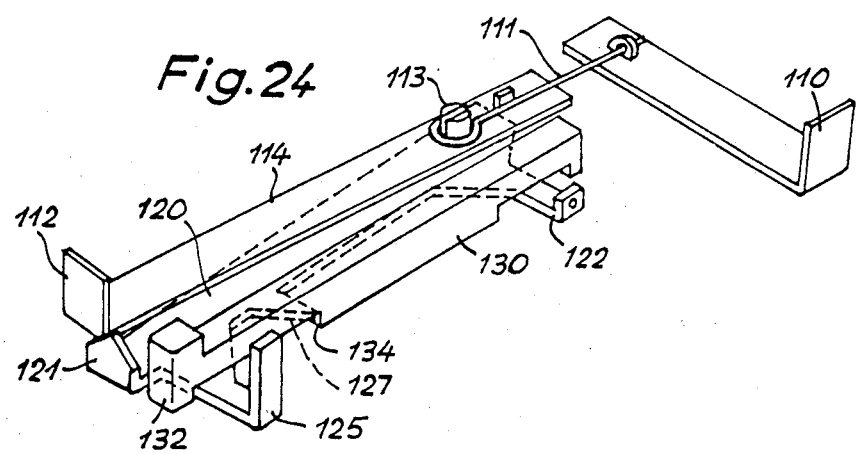

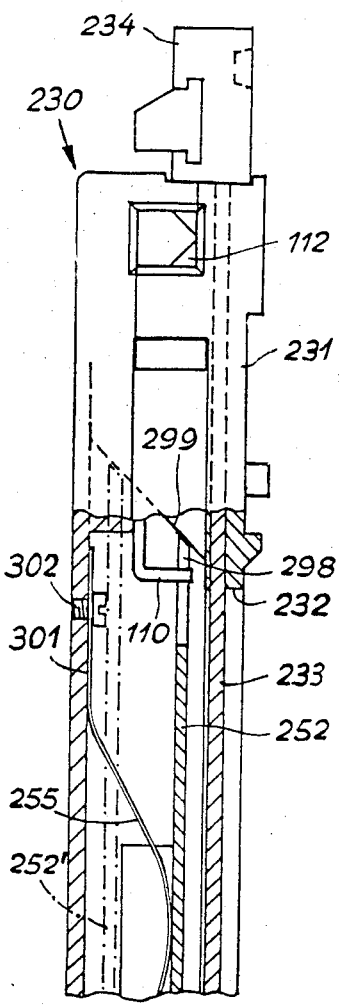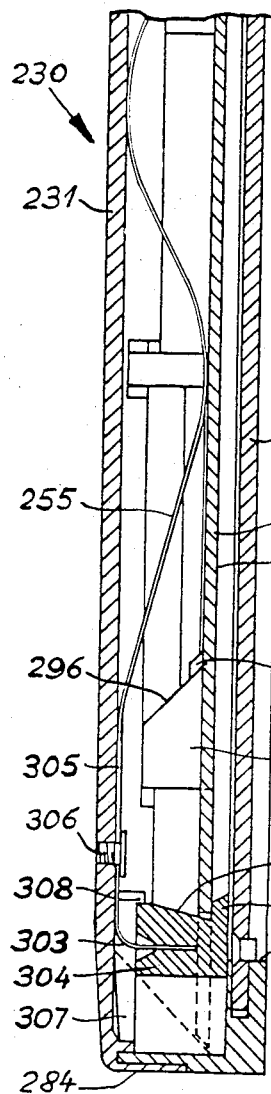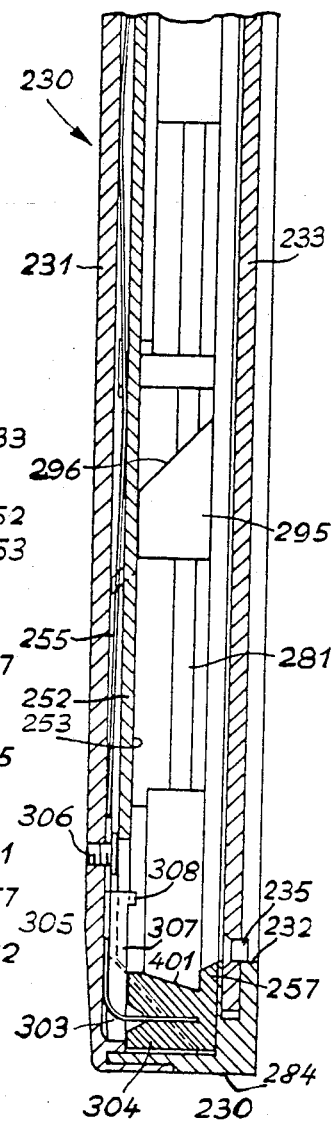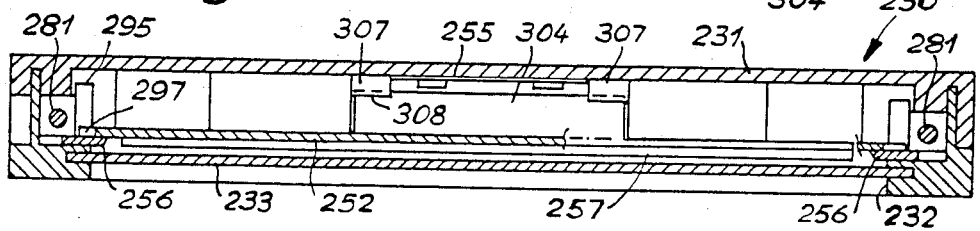

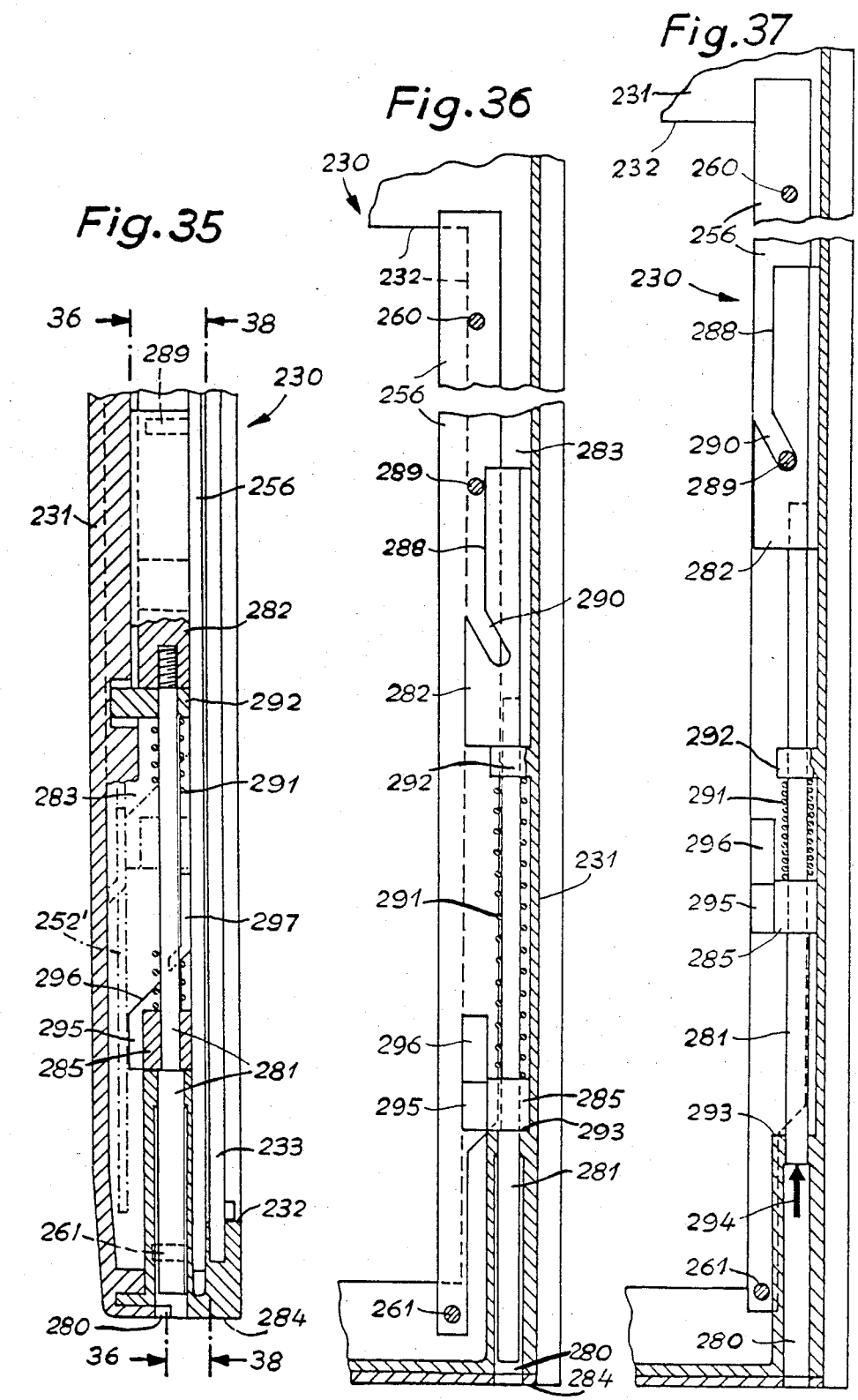

PHOTOGRAPHIC CASSETTE FOR MANIPULATION AND EXPOSURE OF A LIGHT-SENSITIVE SHEET

BACKGROUND OF THE INVENTION

The present invention relates to a photographic cassette to manipulate and expose a light-sensitive sheet, in particular for use in a large format camera.

Cassettes of this kind have been known for a long time. They have a flat housing to insert a light-sensitive sheet and a light-proof slider, designed to be movable on the housing. The function of the slider is to open the opening in the housing or close it against the light. The opening is adjusted to the shape and size of the light-sensitive sheet and, when exposing the sheet, permits the light to enter, when the light-proof slider is moved into the open position. The housing has a supporting surface to brace the back side of the sheet, inserted in the housing, the back side is turned away from the light-sensitive layer; and there are also retaining members to reach over the edge of the light sensitive front side of the sheet, inserted in the housing. The retaining members must hold the light-sensitive sheet at the supporting surface in as planer a position as possible.

In cassettes with a plastic housing, e.g. according to the USAS PH3.26-1951 standard, the retaining members are formed by struts in the housing and are thus not movable. Therefore, a light-sensitive sheet cannot be inserted through the opening of the housing, the opening being to expose the sheet, into the housing at a right angle to the plane of the sheet or removed from the housing. Rather it is necessary to push in or take out the light-sensitive sheet through a slot at the same angle as the plane of the sheet. Consequently the loading and unloading of such cassettes is tedious and must be carried out in a dark room.

So-called ferro-cassettes, which were originally designed for the insertion of glass plates with a light-sensitive layer, are also known. These ferro-cassettes include such cassettes in which at least one part of the retaining members is movable. And for loading and unloading the cassette, the members can be moved out of their original effective positions into ineffective positions so that in principle a photographic sheet or a photographic glass plate can be inserted into the cassette or can be taken out of the cassette through the opening in the housing, the opening permitting the light to enter when exposing, in a direction perpendicular to the plane of the sheet or the glass plate, when the light-proof slider is moved into its open position. In a known embodiment of this cassette, the retaining members are designed stationary on two parts of the floor of the housing such that they are movable with respect to one another, whereas in another known embodiment the movable retaining members are movable via a double eccentric, which can be actuated externally and pivoted in the floor of the housing. Ferro-cassettes of the described type are not usable in modern large format professional cameras and are suitable only for loading flexible light-sensitive film sheets instead of rigid glass plates. In addition to this, they require for loading and unloading time-consuming, careful manipulation with respect to coordinating the movements of the light-proof slider and the movable retaining members. Therefore, operational errors and thus related damage to the photographic material, in particular due to finger prints, are possible.

In the described conventional cassettes there is a fixed distance which forms the intermediate space between the supporting surface for the back side of a light-sensitive sheet on the one hand and the retaining members, which reach over the edge of the light-sensitive layer of the sheet on the other hand. The edges of the sheet have space in the intermediate space. Since the light-sensitive sheet, which will eventually be used, can have a variable width and because in addition thereto, there must be plenty of free space in order to insert the light-sensitive sheet or for pushing the movable retaining members over the sheet, the aforementioned distance must be relatively large. Thus, according to the aforementioned USAS PH3.26-1951 standard, it is at least 0.012 inches =0.3 mm. This means that the flexible film sheet that is usually used today and which has a thickness, ranging in tolerance from 0.19 to 0.24 mm, is not always exactly planar in the cassette. Thus the clarity of the photographic image can be impaired.

SUMMARY OF THE INVENTION

The primary object of the present invention is to provide a photographic cassette, suitable for application in modern large format professional cameras such that, analogous to the aforementioned ferro-cassette, when the light-proof slider is opened, they can be loaded and unloaded through the opening in the housing, the opening permitting light to enter when exposing. Thus it is also suitable for loading and unloading with the aid of automatic or semi-automatic loading and unloading devices. Furthermore, the respective light-sensitive sheet, loaded into the cassette, is held in an almost planar position and thus the light-sensitive surface of the sheet lies exactly in a plane, fixed by the retaining members. Moreover, the cassette, according to the invention, is formed such that errors in manipulation on the part of the photographer or assistants are substantially avoided.

The cassette, according to the invention, has a flat housing for inserting a light-sensitive sheet, a light-tight slider, movable in the housing, in order to release or close in a light-proof manner an opening in the housing, the opening being adapted to the shape and size of the light-sensitive surface of the sheet and permitting both the light to enter when exposing the sheet and the sheet to enter when loading and unloading. the cassette, a supporting surface in the housing for bracing the back side of the sheet, which is inserted in the housing and is turned away from the light-sensitive layer, and retaining members in the housing for gripping the edges of the light-sensitive front side of the sheet inserted in the housing. The retaining members are formed at least partially movable and can be moved, for loading and unloading the cassette, out of their effective position into ineffective positions outside the path of motion, required by the light-sensitive sheet. The cassette has at least one actuator, which is accessible from the outside on the housing of the cassette and which interacts with the retaining members and can be moved between an inactive position in which the retaining members are in their effective positions and an active position in which the retaining members are moved into their ineffective positions.

According to the invention, in this type of cassette the supporting surface acts to brace the back side of the respective light-sensitive sheet, inserted in the housing, at a pressure plate, which is under the influence of at least one assigned pressure spring, which tends to move the pressure plate in the direction against the opening in the housing in order to clamp the sheet, inserted in the housing, between the supporting surface of the pressure plate on the one hand and the retaining members, moved into its effective positions on the other hand. Furthermore, in this cassette of the invention, the actuator for moving the retaining members is also connected to a controller, interacting with the pressure plate such that every movement of the actuator into its active position also results in the pressure plate being pushed back against the influence of the pressure spring in order to create a free space between the supporting surface of the pressure plate and the retaining members. By forcing the pressure plate back, the retaining members are released from the influence of the pressure spring so that the retaining members can be moved with little effort into their ineffective or effective positions and while moving, do not rub on the adjacent edges of the light-sensitive surface of the sheet to be loaded or unloaded. The free space between the supporting surface and the pressure plate, which results when the pressure plate is forced back, on the one hand, and the free space between the supporting surface and the retaining members on the other hand substantially assures the certainty that after inserting a light-sensitive sheet into the housing of the cassette, when moving the actuator into its inactive position, the retaining members travel faultlessly over the neighboring edges of the inserted sheet into their effective positions.

The invention also relates to an apparatus for loading and unloading the cassette. This apparatus has a holder for inserting the cassette and has at least one feeler which is provided stationary on the holder and which is designed and formed such that it automatically engages with the actuator on the cassette when the cassette is inserted into the holder in order to move the actuator into its active positive and thus forces the pressure plate back against the influence of the pressure spring and to move the movable retaining members into their ineffective positions.

This apparatus and the cassette of the invention permit the photographer or his assistants to load and unload the cassette without having to be concerned about the movable retaining members. The apparatus can also be formed such that it permits the cassette to be loaded and unloaded in full ambient light without having to be concerned that destructive light will reach the light-sensitive material.

Other objects, advantages and novel features of the invention will become more apparent from the following detailed description of the invention when taken in conjunction with the accompanying drawings.

BRIEF DESCRIPTION OF THE DRAWINGS

FIG. 1 is a frontal view of the photographic cassette of the invention showing the opening of the housing through which the light-sensitive sheet is loaded into the cassette and through which the light enters when exposing the sheet, portions of the light-proof slider shown broken away for clarity;

FIG. 2 is a side view of the cassette, seen from the left-hand side in FIG. 1, on a larger scale;

FIG. 3 is a lower front end view of the cassette housing shown in FIG. 1;

FIG. 4 is a front view of that part of the light-proof slider of the cassette of FIG. 1 which is provided with a handle;

FIG. 5 is a rear view of the part of the light-proof slider of FIG. 4;

FIG. 6 shows a front view of the handle of the light-proof slider, as seen from above in FIG. 5;

FIG. 7 is a partial cross-sectional view taken substantially along the line 7—7 of FIG. 1, on a larger scale, which shows a safety device to lock the light-proof slider in its locking position;

FIG. 8 is a sectional view taken substantially along the line 8—8 of FIG. 7;

FIG. 9 is a view similar to that of FIG. 8 showing a partially opened light-proof slider;

FIGS. 12A and 12B are detail sectional views taken substantially along line 12—12 of FIGS. 11 and 19, on a larger scale, which show the movable retaining members of the cassette in their effective positions;

FIG. 13 is a detail longitudinal sectional view taken substantially along the line 13—13 of FIG. 12A;

FIG. 14 is a detail cross-sectional view taken substantially along the line 14—14 of FIG. 12A;

FIG. 15 is a perspective view of a pivoting member, which can be seen in FIGS. 12A, 13, 14;

FIG. 16 is a detail view similar to that of FIG. 12A with an opened light-proof slider and retaining members, moved into ineffective positions;

FIG. 17 is a detail longitudinal sectional view taken substantially along the line 17—17 of FIG. 12B;

FIG. 18 is a view similar to that of FIG. 17 with a probing finger to actuate an actuator for the movable retaining members;

FIG. 19 is a detail cross-sectional view taken substantially along the line 19—19 of FIG. 12B;

FIG. 20 is a view similar to that of FIG. 12B with opened light-proof slider and retaining members, moved into their ineffective positions;

FIG. 21 is a detail longitudinal sectional view taken substantially along the line 21—21 of FIG. 20;

FIG. 22 is a cross-sectional view similar to that of FIG. 11 with opened light-proof slider and retaining members moved into their ineffective positions;

FIG. 23 is a detail sectional view taken substantially along the line 23—23 of FIG. 10A, on a larger scale, showing an indicator and a lock bolt in an empty condition of the cassette, which increases the assurance against an error in manipulating the cassette;

FIG. 24 is a perspective view of the indicators and the lock bolt of FIG. 23;

FIGS. 32A and 32B are detail longitudinal sectional views taken substantially long the line 32—32 of FIG. 29, on a larger scale;

FIG. 33 is a sectional view similar to that of FIG. 32B with pressure plate pushed back by retaining members and with retaining members moved into their ineffective positions;

FIG. 34 is a cross-sectional view taken substantially along the line 34—34 of FIG. 29 on a larger scale;

FIG. 35 is a part longitudinal view of the cassette taken substantially along the line 35—35 of FIG. 29, on a larger scale;

FIG. 36 is a part sectional view of the cassette taken substantially along the line 36—36 of FIG. 29, on a larger scale, and along the line 36—36 of FIG. 35;

FIG. 37 is a view similar to that of FIG. 36, which shows one of the movable retaining members in its ineffective position;

DETAILED DESCRIPTION OF THE INVENTION

Figure 10A:
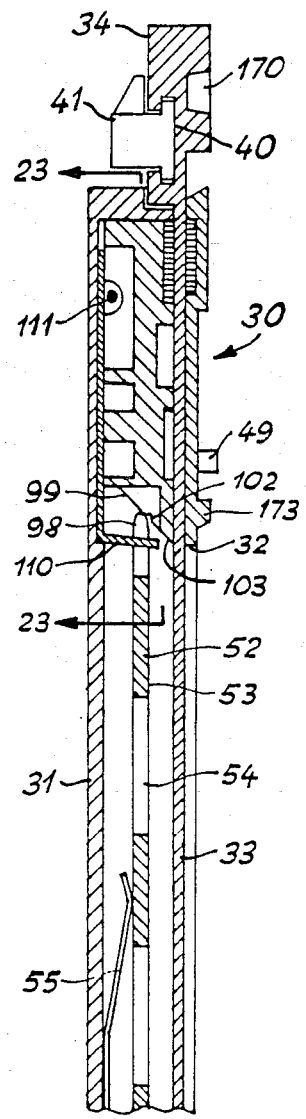
FIGS. 10A and 10B are longitudinal sectional views taken substantially along the line 10—10 of FIG. 1 on a larger scale.

According to FIGS. 1 to 3, the photographic cassette 30, shown in FIGS. 1 to 26, has a flat housing 31 with a right-angle opening 32, which is adapted to the shape and size of a light-sensitive sheet (not shown), in particular a film sheet, which can be inserted into the housing, and permits the light to enter when the sheet is exposed. A light-proof slider 33 is provided for the opening 32 of the housing. The slider can be moved as desired into a locking position, which seals the opening 32 of the housing from the light or, into an open position, which completely opens the opening of the housing. The outer shape and the outer dimensions of the housing fulfill the conventional internationally recognized standards for photographic film cassettes used in large format cameras. The light-proof slider 33 is provided with a handle 34, which facilitates the actuation of the light-proof slider and is also on the outside of the housing 31, when the light-proof slider is moved into its locking position. At the end of the light-proof slider 33, opposite handle 34, there is at least one stationary nipple 35 (FIG. 1), which interacts with a (not shown) stop face on the housing 31, when the light-proof slider is in the open position in order to prevent the light-proof slider from being completely pulled out of the housing.

According to FIGS. 2, 5, and 6, a guide groove 40 for a selector 41, which can be adjusted transversely to the light-proof slider, extends along the handle 34 of the light-proof slider 33. Moreover, the handle 34 has a row of emulsion data fields 42, which are assigned to the various usable types of light-sensitive emulsion on photographic sheets. The emulsion types differ due to their data, such as e.g. sensitive, black-white or color, positive or negative, color temperature, etc. These emulsion data fields 42 are shown (not illustrated) by e.g. numbers, colors and/or code numbers or pictograms. The selector 41 can be manually directed to an arbitrary emulsion data field 42 in order to indicate the emulsion date in question and thus to show to the photographer visually what photographic sheet material is in the cassette 30. A flank of the guide groove 40 for the selector 41 has stop notches 43 (FIG. 5), which are opposite each of the emulsion data field 42. The selector 41 is provided with a (not shown) spring member, designed to lock in one of the stop notches 43 in order to assure that the selector will not be unintentionally dislocated out of its adjusted position.

In order to prevent the light-proof slider 33 from being moved unintentionally into its open position, there is a conventional safety device for locking the light-proof slider into its closed position. According to FIGS. 7 to 9, this safety device has a piston-like locking member 45, which is guided for movement axially into a bore 46 of the housing 31 and is under the influence of a spring 47, which is also arranged in the bore 46. According to FIGS. 4, 8, and 9, the light-proof slider 33 is provided at an edge with a circular segment-shaped notch 48 in which the locking member 45 engages under the influence of the spring 47, when the light-proof slider is in its closed position. This assures that the light-proof slider 33 will stay in its closed position. On an end opposite the spring 47, the locking member 45 has a conical projection 49 (FIGS. 1, 2 and 7 to 9) with a smaller diameter. This projection 49 is outside the path of motion of the light-proof slider 33 and thus does not prevent the movement of the slider in any way. As seen in FIGS. 2 and 7, the projection 49 on the front side of the housing 31, exhibiting the opening 32 of the housing, protrudes outwardly so that it is accessible. By applying pressure to the projection 49, the locking member 45 can be disengaged from its lock position in the notch 48 of the light-proof slider 33 so that the slider can be moved into its open position. FIG. 9 shows the condition just before the light-proof slider 33 begins its opening motion in the direction of arrow 50.

In the housing 31 there is a pressure plate 52 (FIGS. 1, 10A, 10B and 11), whose front side, facing the opening 32 of the housing, forms a supporting surface 53 for the light-sensitive sheet, inserted in the cassette. The pressure plate 52 has numerous perforations 54 in order to faciliate rapid equilibrium of air pressure on the back side of the light-sensitive sheet when loading and unloading, the back side facing the pressure plate. The pressure plate 52 is under the influence of one or more leaf springs 55, which force the pressure plate in the direction of the opening 32 of the housing. Between the opening 32 of the housing and the pressure plate 52 there are retaining members 56 and 57 (FIGS. 1, 10B and 11), which are explained in detail in the following with reference to FIGS. 12A to 22. The purpose of the retaining members 56 and 57 is to grip the edges of the light-sensitive layer of a light-sensitive sheet inserted in the cassette such that this sheet between the retaining members 56 and 57 on the one hand and the supporting surface 53 of the pressure plate 52 on the other hand can be clamped under the influence of the leaf spring 55. In order to be able to insert the light-sensitive sheet into the cassette and to take it out of the same through the opening 32 of the housing in the direction perpendicular to the plane of the sheet when the light-proof slider is open, the retaining members 56 and 57 are designed movable so that they can be moved out of their effective positions into ineffective positions outside the sheet's path of motion, i.e. outside the contours of the opening 32 of the housing, when the cassette is load and unloaded.

The retaining members 56 have the shape of flat strips which extend along opposed longitudinal edges of opening 32 of the housing, parallel to the light-proof slider's 33 path of movement, as shown in particular in FIGS. 1, 11, 12A, 12B. Each of these retaining members 56 has two pilot pins 60 (FIGS. 12A, 16) and 61 (FIGS. 12B, 17, 18, 20), which engage in a guide groove 62 or 63, formed in the housing 31. These guide grooves 62 and 63 have primarily an inclined path with respect to the longitudinal direction of the retaining member 56 in question so that this retaining member is automatically guided such that its movements have a component of motion in the longitudinal direction and a component motion in the lateral direction of the retaining member 56. FIGS. 12A and 12B show one of the retaining members 56 in its effective position, whereas in FIGS. 16 and 20 the same retaining member 56 is shown in its ineffective position. It can be seen that the illustrated retaining member 56 can be moved from its effective position into the ineffective position by exerting force in the longitudinal direction of the retaining member (toward the top in the Figures). Thus the retaining member experiences a laterally-directed component of motion in the direction of the opposite retaining member 56. How and with what means the aforementioned force is exerted on the retaining member 56 is explained below in detail. The movements of the retaining members 56 is effected only in directions parallel to the supporting surface 53 of the pressure plate 52.

A locking member 65 is designed in the vicinity of the upper end of each retaining member 56 of FIGS. 12A and 16. The locking member interacts closely not only with the retaining member 56 in question both also with the light-proof slider 33. The locking member 65, clearly shown in FIG. 15, has an axle 66, which can be rotated in the housing 31 of the cassette, and two arms 67 and 68, which are of different lengths, extending from axle 66, and have semi-cylindrically rounded ends. According to FIGS. 12A and 13, the longer arm 67 is attached to a sliding surface 69 of the retaining member 56. The sliding surface 69 is at a right-angle to the light-proof slider's 33 path of movement. The shorter arm 68 interacts with the adjacent longitudinal edge of the light-proof slider 33, as can be seen in FIGS. 12A and 14. It is evident that the light-proof slider 33 in its closed position locks the locking member 65 via the shorter arm 68 in the position, shown in FIG. 12A. In such position the longer arm 67 of the locking member 65 locks the adjacent retaining member 56 in the effective position, i.e. moved downward in FIG. 12A, by interacting with the slide surface 69. This lock is also maintained even when the light-proof slider 33 is only partially open. If, on the other hand, the light-proof slider 33 is moved completely into its open position, the end of the light-proof slider, the end being turned away from the handle 34, is no longer engaged with the shorter arm 68 of the locking member 65, as FIG. 16 clearly shows, so that it is then possible for the locking member 65 to pivot in the position, shown in FIG. 16, and thus to permit the adjacent retaining member 56 to be moved into its ineffective position, i.e. upward in FIG. 16.

For the sake of simplicity, only one of the two parallel retaining members 56 is shown in FIGS. 12A, 12B, 16, and 20. The second retaining member 56, which is located on the opposite longitudinal edge of the opening 32 of the housing, and the accompanying inclined guide grooves 62, 63, and also the accompanying pivotable locking member 65 are formed and arranged symmetrically.

The aforementioned third retaining member 57, according to FIGS. 1, 12B, 19, 20, and 21, has the shape of a strip and is arranged along the lateral edge of the opening 32 of the housing, such edge being the most removed from the handle 34 of the light-proof slider 33. Each end of the retaining member 57 is coupled by means of a hinge pin 70 to one arm of a two armed lever 71, which can be pivoted via a pivot pin 72 in the housing 31, as shown in particular in FIGS. 12B, 19, 20. The other arm of the lever 71 is coupled via another hinge pin 73 with a projection 74 of the adjacent retaining member 56. The (not shown) other end of the retaining member 57 interacts with the adjacent retaining member 56 in a symmetrical manner. It is clear that the result of the components of motion, conforming with the longitudinal directions of both retaining members 56, is that the third retaining member 57 moves in the opposite direction transversely to its longitudinal direction via the lever 71. If at times both retaining members 56 are moved into their effective positions, the third retaining member 57 will also be in its effective position, according to FIG. 12B; and if both retaining members 56 are moved into their ineffective positions, the third retaining member 57 will also be moved into its ineffective position, according to FIGS. 20 and 21. Even the movements of the third retaining member 57 will be exclusively in directions parallel to the supporting surface 53 of the pressure plate 52.

The following mechanisms, described below, move the retaining members 56 and 57 from their effective positions into their ineffective positions. In housing 31 two bores 80 (FIGS. 3, 17, and 18) are located in the vicinity of one of the retaining members 56, and in particular, such that these bores 80 extend parallel to the light-proof slider's 33 path of movement. In each of these bores a movable ram 81 is provided such that it can move axially; the ram is screwed rigidly to a boring head 82, which is in a recess 83 of the housing 31, as shown in FIGS. 17 and 18. The interconnected pieces 81 and 82 together form an actuator, which can be actuated via a feeler 85 (FIG. 18) and is accessible from the outside on the end front face 84, opposite handle 84 of the light-proof slider 33. In the recess 83 there is also a projection 86, arranged on the adjacent retaining member 56, with a through bore 87 in which another ram 88 can be moved axially, and it extends parallel to the path of motion of the light-proof slider 33 and the actuator 81, 82. This ram 88 has a head 89, designed to interact with an inclined sliding surface 90 of a head piece 82, as is evident from FIGS. 17 and 18 and also FIGS. 12B and 20. A pressure spring 91, which tends to hold the head 89 of the ram 88 in position on the sliding surface 90 of the head piece 82 of the actuator 81, 82 and to force the latter into the rest position, shown in FIGS. 12B and 17, is located between the projection 86 and the head 89 of the ram. Via the pressure spring 91, the actuator 81, 82 is flexible and positively coupled with the adjacent retaining member 56.

A symmetrically formed mechanism for motion drive (which for the sake of simplicity is not shown in the drawings) is assigned to the second retaining member 56, arranged on the opposite longitudinal edge of the opening 32 of the housing.

As described previously, the two parallel retaining members 56 are locked, according to FIGS. 1, 11, 12A and 12B, into their effective positions by means of the assigned locking members 65 when the light-proof slider 33 is closed. Thus, according to FIGS. 1, 10B, and 12B, even the third retaining member 57, coupled with the retaining members 56, is locked into their effective positions. If the photographer plans to load the cassette with a light-sensitive sheet or to remove an exposed sheet from the cassette, the retaining members 56 and 57 must be moved into their ineffective positions in which they are outside the contours of the opening 32 of the housing. For this purpose when the light-proof slider 33 is still closed, both actuators 81, 82 are pushed against the influence of the pressure springs 91 into the position, shown in FIG. 18, with the aid of two feelers 85, guided simultaneously into the borings 82. Thus the pressure springs 91 are squeezed together since, of course, the retaining members 56 are still locked in their ineffective positions against motion. When later the light-proof slider 33 (in the case of an interlocking member 45, unlocked via the projection 47; FIGS. 7 to 9), is opened, the light-proof slider 33 manages to disengage with the shorter arm 68 of each locking member 65. This permits the latter to pivot in a position which releases retaining member 56, according to FIG. 16. Then the force stored in each pressure spring 91 is capable of moving retaining member 56 into its ineffective position, according to FIGS. 16, 20, and 22. Via the two arm lever 71, the third retaining member is also moved simultaneously into its ineffective position, according to FIGS. 20 and 21. Then the path is free for a light-sensitive sheet, which can be inserted into the cassette or removed from the same in a direction perpendicular to the plane of the sheet through the opening 32 of the housing, preferrably under the influence of the force of gravity.

If the light-proof slider 33 is moved into its locking position, its corners, opposite handle 34, and its longitudinal edges will engage with the shorter arm 68 of each locking member 65. Thus the locking members 65 are swung out of their positions, shown in FIG. 16, into their positions, shown in FIG. 12A. At the same time the rounded corners of the longer arm 67 of each locking member 65 presses down on the sliding surface 69 of the adjacent retaining member 56, thus moving the latter into its effective position, independent of whether the assigned actuator 81, 82 is in its rest position, according to FIG. 17, or still moved via the feeler 85 into the position, shown in FIG. 18. By means of the described movements of both retaining members 56, even the third retaining member 57 is moved back into its effective position via the two arm lever.

In using the cassette 30 in a photographic large format professional camera, the actuators 81, 82 remain immobile in their rest positions, according to FIGS. 12B and 17. Therefore, the retaining members 56 and 57 remain in their effective positions, when the light-proof slider 33 is opened and afterwards closed again for the purpose of exposing the light-sensitive sheet, loaded into the cassette.

According to FIGS. 12B, 20, and 21, the head piece 82 of each actuator 81, 82 has a protrusion 95, which has an inclined sliding surface 95, according to FIG. 21. The latter is meant to interact with a laterally projecting lug 97 of the pressure plate 52, such that the inclined sliding surface 96 engages with the lug 97 of the pressure plate 52 when the actuators 81, 82 are actuated counter to the influence of the pressure spring 91, thus causing the pressure plate to move not only in the direction parallel to the light-proof slider's 33 path of movement but also counter to the influence of the leaf springs 55 in a direction away from the opening 32 of the housing, i.e. to the left in FIG. 21 and upward in FIG. 22. The components of motion, issued to the pressure plate 52, in a direction parallel to the light-proof slider's 33 path of motion results in the end 98 (FIG. 10A) of the pressure plate 52 engaging with a stationary inclined sliding surface 99 of the housing 31, the end being in the vicinity of the handle 34 of the light-proof slider 33. Thus even the part of the pressure plate 52, which is adjacent end 98, is issued a component of motion in the direction of the opening 32 of the housing. Thus actuating both actuators 81, 82 automatically forces the pressure plate 52 away from the retaining members 56 and 57, which are in their effective positions, counter to the influence of the leaf springs 55 and this in turn releases the clamping of the edges of a light-sensitive sheet in the cassette between the pressure plate and the retaining members 56 and 57, before the retaining members 56 and 57 are moved into their ineffective positions when subsequently the light-proof slider 33 is opened. Conversely, when the cassette is loaded with a light-sensitive sheet, the retaining members 56 and 57 are moved into their effective positions when the light-proof slider 33 closes, before the pressure plate 52 is released to clamp the edges of the inserted sheet, provided the actuators 81, 82 are still actuated counter to the influence of the pressure springs 91.

This method has the advantage that during the movements of the retaining members 56 and 57 into their ineffective positions and into their effective positions, the pressure plate 52 is forced back counter to the influence of the leaf springs 55 and cannot exert any frictional forces, impeding the retaining members in their movements. Another decisive advantage is that during the movement of the retaining members 56 and 57 from their ineffective into their effective positions between the pressure plate 52 on the one hand and the retaining members' 56 and 57 paths of movement on the other hand there is sufficient ample space for the edges of a light-sensitive sheet, inserted in the cassette, so that the retaining members 56 and 57 are unimpeded and can be moved into their effective positions without making destructive contact with the light sensitive sheet. In such positions they grip the edges of the light-sensitive layer of the sheet.

Figure 10B:
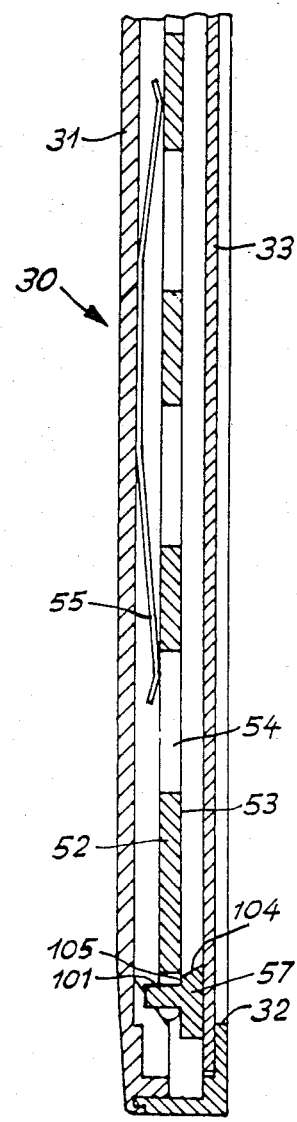
Figure 11:
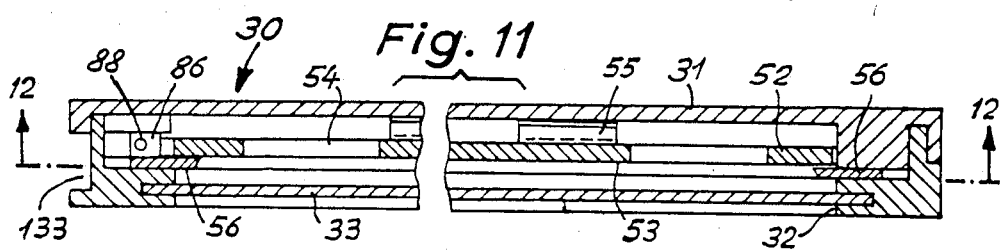
FIG. 11 is a cross-sectional view taken substantially along the line 11—11 of FIG. 1 on a larger scale, in which two retaining members, moved into effective positions, for a light-sensitive sheet (not shown), inserted into the cassette, can be seen.

According to FIG. 10B, the third movable retaining member 57 has a stop face 101, which is at right angles to the retaining member's path of movement. Its purpose is to move a light-sensitive sheet, which is inserted through the opening 32 of the housing into the cassette, along the supporting surface 53 of the pressure plate 52 (pushed back against the influence of the leaf springs 55), when the retaining member 57 is moved into its effective position. The purpose of this displacement of an inserted light-sensitive sheet is to move the lateral edge of the sheet, opposite the retaining member 57, under a stationary stop face 102 (FIG. 10B, formed on the housing 31), at the lateral edge of the opening 32 of the housing; such edge being closer to the handle 34. The purpose of an inclined surface piece 103 is to guide projecting corner pieces of the light-sensitive sheet, if the occasion arises, to the stop face 102. When the pressure plate 52 is released, after the movable retaining members 56 and 57 have been moved into their effective positions, such edges of the sheet, inserted into the cassette, such edges reaching under the stop face 102, are pressed back against the stop face 102 via the pressure plate 52 under the influence of the leaf springs 55. According to FIG. 10B, an inclined surface 104 is also on the movable retaining member 57 in order to guide, if the occasion arises, the projecting corners of the light-sensitive sheet, inserted through the opening 32 of the housing into the cassette to the stop face 101 and under a stop face 105 when this retaining member moves into its effective position.

According to FIGS. 10A and 23 to 26, a movable feeler 110 is in the housing 31. The feeler can be moved in a direction parallel to the light-proof slider's 33 path of movement and designed such that it can be actuated by the light-sensitive sheet, inserted in the cassette, when the sheet is moved via the third retaining member 57, as described above. The feeler 110 is under the influence of a spiral spring 111 (FIGS. 23 to 26), which tends to move the feeler counter to the displacement of the light-sensitive sheet into the initial position, according to FIGS. 10A and 23. The feeler 110 has two functions of which the first function is to push back the light-sensitive sheet in the cassette, when unloading the cassette, into a position, which conforms to the opening 32 of the housing, when the light-proof slider 33 is opened and the movable retaining member 56 and 57 assume their ineffective positions. The second function of the feeler 110 is to actuate the first indicator 112 (FIGS. 23 to 26) for visual indication of the load condition of the cassette. The indicator 112 is a deflected part of a lever 114, pivoted via a hinge pin 113, and can be seen through a side window 115 of the housing 31 when the feeler 110 is in its rest position, i.e. when no light-sensitive sheet is in the cassette. The purpose of the aforementioned spiral spring 111 and a stop lug 116, which interacts with this spring and which is located at the lever 114, is to couple the feeler 110 to the lever 114.

Figure 26:
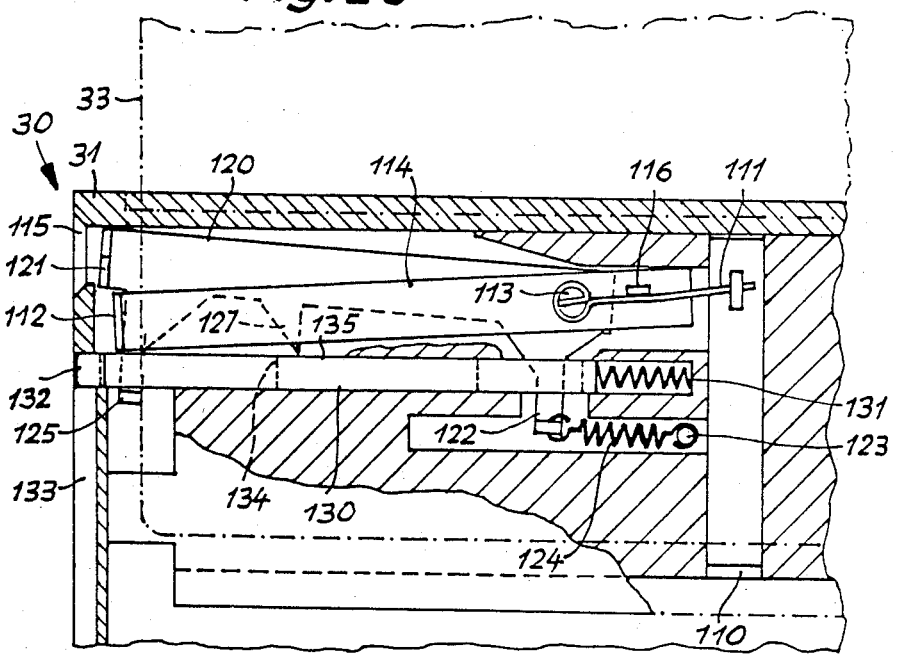
FIG. 26 is another view similar to that of FIG. 23, which shows the indicators and the lock bolt with loaded cassette and opened light-proof slider.

Another lever 120, which is also pivoted around the hinge pin 113 and which has a deflected piece for forming a second indicator 121, which can also be brought into a position, which is visible through the window 115, can be pivoted around a hinge pin. Between an arm 122 of the lever 120 and a pin 123, fastened in the housing 31, there is a tension spring 124, which tends to swing the lever 120 into the position shown in FIG. 23 in which the second indicator 121 is swung away from the window 115 and can, therefore, not be seen from the outside. The end of the lever 120, which supports the second indicator, also has a projection 125, which designed to interact with the adjacent longitudinal edge of the light-proof slider 33. In the longitudinal edge of the light-proof slider 33 a triangular edge recess 126 is provided, in which the projection 125 engages when the light-proof slider is moved into its closed position and the lever 120 is in the rest position, shown in FIG. 23. It is clear that when the light-proof slider 33 is moved out of its closed position against its open position, the projection 125 is pushed out of the edge recess 126, as shown in FIG. 26. The result of this is that the lever 120 is swung counter to the influence of the tension spring 124 so that when the second indicator 121 can be seen in the window 115, which can be distinguished logically in shape and color from the first indicator 112.

Finally the lever 120 has a projection 127, which serves as a latch and which is meant to interact with a bolt 130. The latter is mounted movable in the housing 131; and in particular such that it can be moved at a right angle to the light-proof slider's 33 path of movement into an effective interlocking position, according to FIG. 26, and into an ineffective interlocking position, according to FIGS. 23 and 25. The bolt 130 is under the influence of a pressure spring 131, which tends to push the bolt 130 into the interlocking position in which an end 132 of the bolt 130 projects into a groove 133, which is designed externally on one of the narrow longitudinal sides of the housing 31. The bolt 130 also has a stop face 134 with which the projection 127 of lever 120, which serves as a latch, can engage in order to lock the bolt 130 in its ineffective unlocking position counter to the influence of the pressure spring 131.

The manner in which the mechanism is operated and applied are described with reference to FIGS. 23 to 26 as follows: When loading the cassette with a light-sensitive sheet, the feeler 110 is moved by the sheet—as stated above—out of its rest position, according to FIG. 23, into the position, shown in FIG. 25. In this manner, the lever 114 is swung via the spiral spring and and the stop lug 116 such that the first indicator 112 is moved away from the window 115 into an invisible position. When at the end of the loading process, the light-proof slider 33 is moved completely into its closed position, the edge recess 126 of the light-proof slider is in the operational range of the projection 125 in order to permit the projection to engage with the edge recess 126. Yet this is possible only when previously the bolt 130 was manually moved into its unlocking position by exerting a force on the end 132 that overcame the influence of the pressure spring 131. As soon as the bolt 130 has attained its unlocking position, the projection 127 of the lever 120, which serves as a latch, catches in front of the stop face 134 of the bolt under the influence of the tension spring 124 in order to lock the bolt into the unlocking position. At the same time the second indicator 121 also moves from the window 115 into an invisible position, as illustrated in FIG. 23. At any time the photographer can recognize that the cassette is loaded with a light-sensitive sheet that is still unexposed by the fact that neither of the indicators 112 and 121 is now visible in the opening of the window 115.

When the loaded cassette is attached to a photographic camera and the light-proof slider 33 is moved into its open position in order to expose the light-sensitive sheet, the projection 125 of the lever 120 is pushed out of the edge recess 126 of the light-proof slider. The result of this is that the lever 120 is swung counter to the influence of the tension spring 124, whereby the projection 127, which serves as the latch, is guided away from the stop face 134 of the bolt. Therefore, the bolt is permitted to be moved under the influence of the pressure spring 131 into the interlocking position, according to FIG. 26. Due to the swivelling of the lever 120, the second indicator 121 is also moved into the region of the window opening 115. When the light-proof slider is closed after the light-sensitive sheet has been exposed, the edge recess 126 of the light-proof slider moves again into the projection's 125 area of motion. This would permit the lever 120 to return to its original position. Since now, however, the bolt 130 has been moved into its interlocking position, the projection 127 of the lever 120, which serves as a latch, is now opposite a stop face 135 of bolt 130. This permits the lever 120 to swing back into its original position under the influence of the tension spring 124. Consequently the second indicator 121 is visible in the window opening in order to visually show to the photographer that an exposed sheet is in the cassette. The function of the end 132, which projects into the groove 133 of the housing 31, is to prevent the unintentional attachment of a cassette to a camera. This prevents unwanted double exposures of a light-sensitive sheet. If the photographer wants to make a second or more exposures of the light-sensitive sheet, he can, beforehand, push back the bolt 130 by exerting force on its end 132, until the projection of the lever 120, the projection serves as a latch, re-locks in front of the stop face 134 of the bolt.

Figure 27:
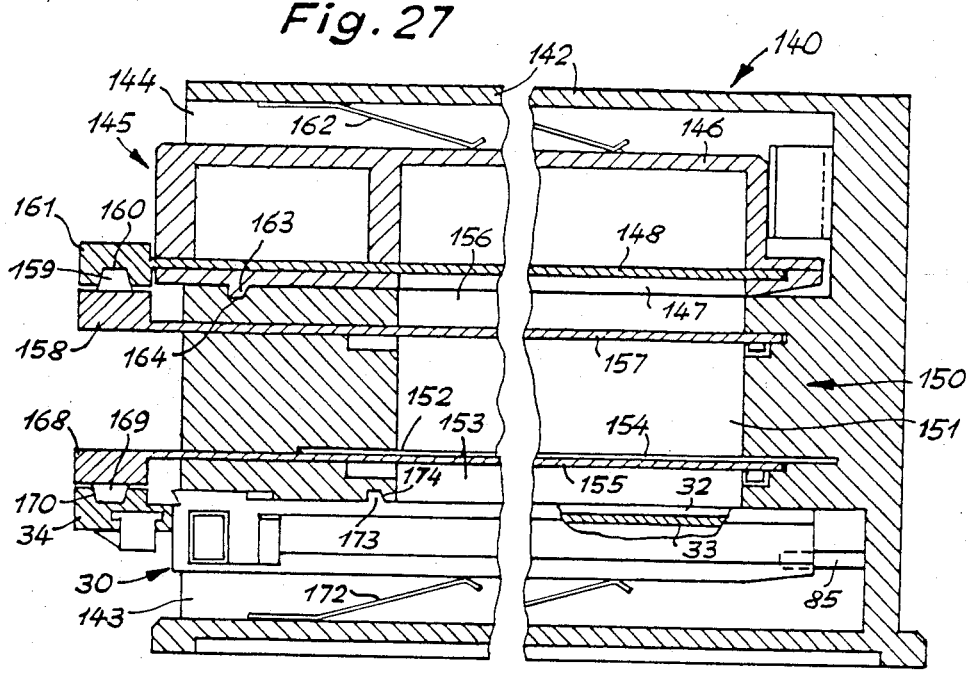
FIG. 27 is a vertical sectional view taken through a device for semi-automatic loading of the cassette, shown in FIGS. 1–26, with a light-sensitive sheet in full ambient light.

The purpose of the end 132 of the bolt 130, the end projecting following the exposure of a light-sensitive sheet loaded into the cassette, is also to prevent the cassette from being inserted into a loaded apparatus, as described for example with reference to FIG. 27, in order to prevent a second sheet from being unintentionally loaded into the already loaded cassette.

When the cassette is unloaded and the bolt 130 has not been pushed back into its ineffective unlocking position, the first and second indicator 112 and/or 121 can be seen simultaneously in the window opening 115. This shows the photographer visually that there is no light-sensitive sheet in the cassette. In addition to this, the end 132 of the bolt 130, the end projecting into the groove 133 of the housing 31, prevents the unintentional use of the empty cassette at this camera.

An advantageous loading device for semi-automatic loading of the described cassette 30 in full ambient light is illustrated in FIG. 27. The illustrated loading device 140 has a housing-like holder 142 with a lower interior space 143 in which the cassette 30 to be loaded can be inserted like a drawer, and an upper interior space 144 in which a container 145 for raising a stack of light-sensitive sheets can also be inserted like a drawer. The container comprises a housing 146, which contains a stack (not shown) of light-sensitive sheets. The container has an opening 147, which is adjusted to the surface dimensions of the sheets with respect to the shape and size, and a light-proof slider 148, which can be moved into a closed position in which the opening 147 is light-sealed, and into an open position in which this opening totally released. It is evident from FIG. 27 that the opening 32 of the housing of the cassette 30 is turned upward and the opening 147 of the container 145 is focused downward. Between the lower interior space 143 and the upper interior space 144 of the holder 142 there is a separator 150, which is integrated into the latter. The separator has a storage space 151 for the intake of a stack comprising of several light-sensitive sheets and a movable, e.g. rotatable separating member 152 for bracing the stack and for separating the lowermost sheet from the stack and transferring the separated sheet into another lower output opening 153. The separating member 152 is primarily a plane disc, whose thickness is somewhat narrower than the width of a single light-sensitive sheet. In its middle the separating member 152 has a perforation 154, which is comparable in shape and size with each single light-sensitive sheet. Directly below the separating member 152 there is a lowermost light-proof slider 155, which can be moved selectively into a closed position, which seals the light from the output opening 153, or into an open position, which completely exposes the opening. The light-proof slider 155 is coupled via a mechanical connector, which is not shown here, to the separating member 152 such that by means of sequential movements of the light-proof slider 155 into its open position and back into its closed position, the separating member 152 is automatically rotated by some angular degrees and rotated back, thus separating the lowermost sheet from the stack of light-sensitive sheets and transferring the sheet into the output opening 153. The details concerning the construction and operating method of the separator 150 are published in U.S. Pat. No. 4,592,634. Therefore, a detailed explanation can be omitted here.

The storage space 151 of the separator 150 has at the top an input opening 156, comparable with respect to shape, size and position with the opening 147 of the container 145, which is inserted into the holder 142. An uppermost light-proof slider 157 is assigned to the input opening 156 of the storage space 151. The slider can be moved into a closed position, which seals the opening 156 against light, and into an open position, which totally exposes the opening. It is clear from FIG. 27 that the uppermost light-proof slider 157, which was mentioned last, and the light-proof slider 148 of the container 145, inserted into the holder 142, are arranged parallel to one another and can be moved in parallel directions. It is also evident that the uppermost light-proof slider 157 of the separator 150 has a handle 158, having a projection 159, which engages with a corresponding recess 160 of a strip 161 on the light-proof slider 148 of the container 145, the strip serving as a handle, when the container 45 is correctly inserted into the holder 142.

Thus both light-proof sliders 148 and 157 are coupled together so that they can at times be moved together and moved in the same direction into their open and closed positions. In the interior space 144 for intake of container 145 there are springs 162, e.g. in the shape of leaf springs, which automatically push the inserted container downward, in order to assure a light-sealed contact between the container and the separator 150 and to bring about the aforementioned coupling of both light-proof sliders 148 and 157. The influence of the springs 162 also results in a rib 163 of the housing 146, the rib extending transversely to the direction in which the container 145 was pushed, automatically engaging with a corresponding groove 164 on the uppermost side the separator 150, thus assuming that the container will not slide unintentionally out of the holder 142, in particular when opening the light-proof slider 148.

The output opening 153 of the separator 150 is comparable in shape, size, and position with the opening 32 of the housing of the cassette 30, inserted correctly into the holder 142. And the lowermost light-proof slider 155 of separator 150 and the light-proof slider 33 of cassette 30 are arranged parallel to one another and can be moved in parallel directions. The lowermost light-proof slider 155 of separator 150 has a handle 168, having a projecting 169, which couples with a corresponding recess 170 of handle 34 of light-proof slider 33 of cassette 30, when the cassette is correctly inserted into holder 142. Thus both light-proof sliders 33 and 155 are coupled together so that at times they can be moved together and in the same direction into their open and closed positions. In the interior space 143 for intake of cassette 30 there are springs 172, e.g. in the shape of leaf springs, which automatically push the inserted cassette 30 upward in order to assure a light-sealed contact between the cassette and the separator 150 and to bring about the aforementioned coupling of both light-proof sliders 33 and 155. The influence of the springs 172 also results in a rib 173, extending transversely to the direction of thrust and arranged on the cassette 30 automatically engaging with a corresponding groove 174 on the lower side of the separator 150, thus assuring the cassette will not slide unintentionally out of the holder 142, in particular when opening the light-proof slider 33. In the interior space 143 two feelers 85 are fixed, of which only one is shown in FIG. 27. These feelers are intended to interact with the actuators 81, 82 (FIGS. 17 and 18) of the cassette in order to assure both actuators 81, 82 will be automatically actuated when the cassette is inserted into the holder 142.

The cassette loader 140, according to FIG. 27, is operated as explained below:

It is assumed that the storage space 151 of the separator 150 is empty and that both light-proof sliders 155 and 157 of the separator are closed. It is also assumed that in the housing 146 of the container 145 there is a stack of 20 to 50 unexposed photographic film sheets, which have been inserted in darkness into the container either in the manufacturing plant or by the photographer and that the light-sensitive layer of each film sheet is turned away from the light-proof slider 148. The light-proof slider 148 of container 145 is closed in order to protect the film sheets against ambient light. The filled container 145 is inserted into the interior space 144 of the holder, as illustrated in FIG. 27. Thus under the influence of the springs 162 the coupling projection 159 on the handle 158 of the uppermost light-proof slider 157 of the separator 150 couples with the assigned recess 160 on the handle 161 of the light-proof slider 148 of the container 145. Later the photographer can move the two coupled light-proof sliders 148 and 157 together into their open positions. Then the stack of photographic film sheets fall under the influence of gravity in the direction perpendicular to the film sheets out of the container 145 into the storage space 151 of the separator. The photographer then pushes the two coupled light-proof sliders 148 and 157 together back into their closed positions. Finally the empty container 145 can be pulled out of the holder 142 and, if the occasion arises, put to some other application.

It at some later date the photographer wants to load a photographic cassette 30 with an unexposed film sheet, he pushes the cassette with the closed light-proof slider 33 into the lower interior space 143 of the holder 142, as shown in FIG. 27. In this manner the two feelers 85 engage with both actuators 81, 82 of the cassette, thus actuating these actuators, as described with reference to FIG. 18. This in turn puts a load on the pressure springs 91 (FIGS. 17 and 18), and the pressure plate 52 is pushed back from the retaining members 56 and 57, which are still in their effective positions, under the influence of the leaf springs 55, assigned to the pressure plate. Furthermore, when the cassette 30 is inserted, the coupling projection 169 on the handle 168 of the lowermost light-proof slider 155 of the separator 150 engages under the influence of the springs 172 with the assigned recess 170 in the handle of the light-proof slider of cassette 30. Finally, by pressing the cassette 30 against the separator 150 through the springs 172, the projection 49 of the interlocking member 45 (FIGS. 7 to 9) of the light-proof slider of the cassette is automatically actuated and thus the light-proof slider unlocks so that it can be opened later.

When the photographer thereafter moves the two coupled light-proof sliders 33 and 155 of the cassette and the separator together into their open positions, the following occurs: Through the process of opening the light-proof slider 33 of the cassette, the movable retaining members 56 and 57 are permitted—as described with reference to FIGS. 16 and 20—to assume their ineffective positions, under the influence of the loaded pressure springs 91. In the ineffective positions they are outside the contours of the opening 32 of the housing of the cassette. Through the process of opening the lowermost light-proof slider 155 of the separator 150, the separating member 152 is actuated such that the lowermost film sheet is separated from the remaining stack in the storage space 151 and then finally under the influence of gravity falls through the output opening 153 into the cassette 30, and in particular in the direction perpendicular to the plane of the film sheet. (The operating mode of the spearating member 152 is explained in the aforementioned German patent application 34 16 064). Later the photographer pushes the two coupled light-proof sliders 33 and 155 back into their closed positions. Through the process of closing the light-proof slider of cassette 30, the movable retaining members 56 and 57 are forced to assume their effective positions in which each member grips an edge of the film sheet loaded into the cassette. Later the photographer can take the now loaded cassette 30 out of the holder 142. Thus the feeler 85 automatically disengages from the actuators 81, 82. Under the influence of the pressure springs 91 (FIG. 18) the actuators 81, 82 move back into their rest positions, according to FIG. 17, thus releasing the pressure plate 52 of the cassette so that later it forces under the influence of the leaf springs 55 assigned to it the film sheet inserted into the cassette against the retaining members 56 and 57 and holds it tight in a planar position. In the manner described the film sheets, which are stacked in the storage space 151 of the separator 150, are inserted individually one after the other into the cassette in full ambient light.

Figure 25:
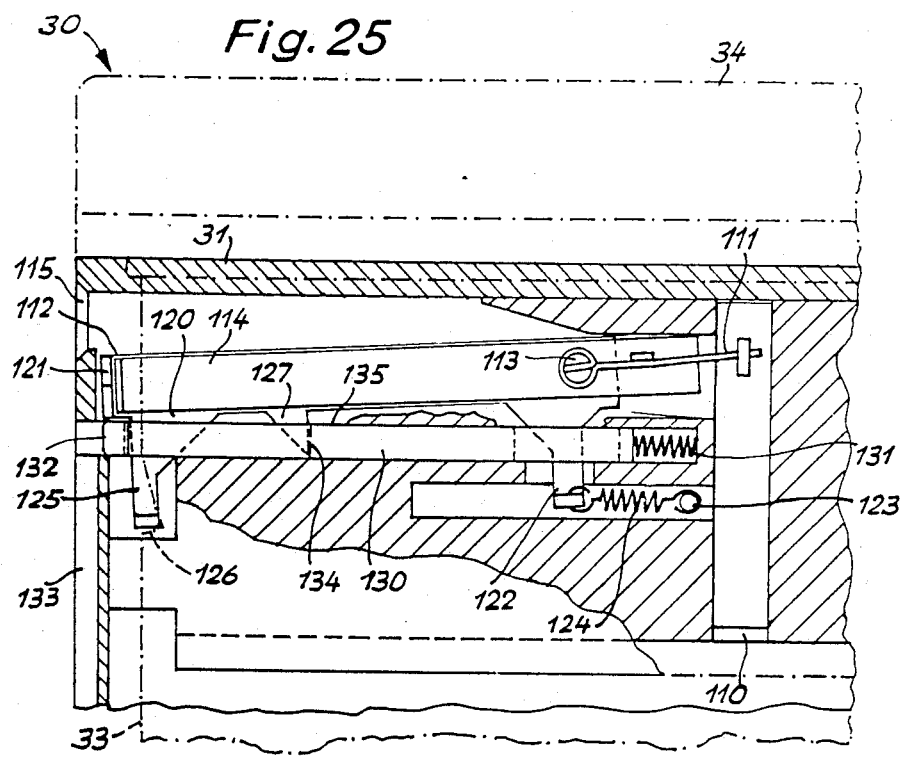
FIG. 25 is a view similar to that of FIG. 23, which shows the indicators and the lock bolt with loaded cassette and closed light-proof slider.

On the loaded cassette 30 the selector 41 is set on the respective emulsion data field 40, whose data relates to the light-sensitive layer of the film sheet, inserted into the cassette. Furthermore, the bolt 130 (FIG. 25) has to be pushed by means of pressure on the end piece 132, projecting into the groove 133, into its ineffective unlocking position in which the bolt is held tight by the projection 127, which serves as a latch, as shown in FIG. 25.

Figure 28:
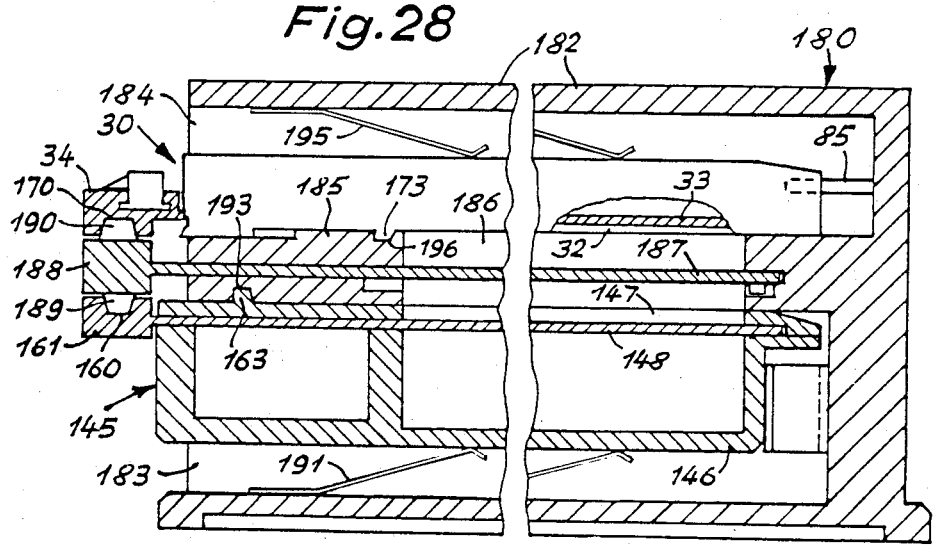
FIG. 28 is a vertical sectional view taken through a device to unload the cassette, shown in FIGS. 1-26, in full ambient light.

FIG. 28 shows an example of another system 180, which facilitates transporting semi-automatically, i.e. unloading the cassette, in full ambient light an exposed film sheet or a film sheet, which will eventually be exposed, out of a cassette 30 into a container 145 without any destructive light entering the system. The system 180 has a housing-like holder 182 with an interior space 183 in which the container 30 can be inserted like a drawer, and an uppermost interior space 184 in which the cassette to be unloaded can also be inserted like a drawer. It is evident that the opening 147 of the container 145, inserted into the holder 182, is turned upward, whereas the opening 32 of the housing of the cassette 30, inserted into the holder, is turned downwards. Between the lowermost interior space 183 and the uppermost interior space 184 the holder 182 has an intermediate floor 185 with a perforation 186, which is comparable in shape, size, and position with the openings of the container 145 and the cassette 30, when they are correctly inserted into the holder.

A light-proof slider 187, embedded into the intermediate floor 185, is assigned to the perforation 186. The light-proof sliders 148 and 33 of the container 145, inserted into the holder 182, and/or of the cassette 30, inserted into the holder, are arranged parallel to one another and can be moved in parallel directions. It is clear from FIG. 28 that the light-proof slider 187, embedded into the intermediate floor 185, has a coupling piece 188 with two downward and/or upward projecting projections 189 and 190, which are designed to couple with the recesses 160 and 170 on the handles 161 and 34 of the light-proof sliders of the container 145 and/or of the cassette 30. In this manner all three light-proof sliders 148, 187, and 33 are coupled together so that at times they can be moved together and in the same direction into their open and closed positions.

In the lowermost interior space 183, designed to accept the container 145, there are springs 191, e.g. in the shape of leaf springs, which automatically push the inserted container upward in order to assure a light-sealed contact between the container and the intermediate floor 185 and to bring about the aforementioned coupling of the light-proof sliders 148 and 187. The influence of the springs 191 also results in the rib 163 of the container, the rib extending tranversely to the direction in which the container 145 is thrust, automatically engaging with a corresponding groove 193 on the lower side of the intermediate floor 185. Thus the container is assured against the holder 182 unintentionally sliding out, in particular, when opening the light-proof slider 148.

In the upper interior space 184 for acceptance of the cassette 30 there are also springs 195, e.g. in the shape of leaf springs, which automatically push the inserted cassette 30 upward in order to assure a light-sealed contact between the cassette and the intermediate floor 185 of the holder 182 and to bring about the aforementioned coupling of the light-proof sliders 33 and 187. The influence of the springs 195 also results in the rib 173, running transversely to the direction of thrust and arranged on the cassette 30, automatically engaging with a corresponding groove 196 at the upper side of the intermediate floor 185. This assures that the cassette will not unintentionally slide out of the holder 182, in particular when opening the light-proof slider. Furthermore, in the uppermost interior space 184 there are two feelers 85 for interaction with the actuators 81, 82 (FIG. 18) of the cassette 30.

The operational mode of the cassette unloader 180, according to FIG. 28, is as follows:

It is assumed that the light-proof slider 187, embedded in the intermediate floor 185 of the holder 182, is in the closed position. Now the photographer inserts the container 145 with the closed light-proof slider 148 into the holder 182, as shown in FIG. 28. Under the influence of the springs 191, the lowermost projection 189 on the coupling piece 188 of the light-proof slider 187, embedded in the intermediate floor 185, automatically couples with the assigned recess 160 on the handle 161 of the light-proof slider 148 of the container.

A cassette 30, which is to be loaded and which contains an exposed film sheet, is inserted into the uppermost interior space 184 of the holder 182 in the manner shown in FIG. 28. At the same time the feelers 85 engage with the actuators 81, 82 (FIG. 18) of the cassette, thus loading the pressure springs 91. And the pressure plate 52 is pushed back away from the retaining members 56 and 57, which are still in their effective positions. Furthermore, the result of the influence of the springs 195 is that the uppermost projection 190 on the coupling piece 188 of the light-proof slider 187, embedded into the intermediate floor 185, engages with the assigned recess 170 on the handle 34 of the light-proof slider 33 of the cassette 30. And finally under the influence of the springs 195, the cassette 30 is forced against the upper side of the intermediate floor 185 in such a manner that the prolongation 47 of the interlocking member 45 (FIGS. 7 to 9) is actuated and the light-proof slider 33 of the cassette is unlocked.

The photographer thereafter moves all three coupled light-proof sliders 33, 148 and 187 together into their open positions. Thus the movable retaining members 56 and 57 of the cassette are released, whereupon they are moved under the influence of the loaded springs 91 (FIG. 18) into their ineffective positions. The exposed film sheet then falls under the influence of gravity out of the cassette 30 through the perforation 186 of the intermediate floor 185 into the container 145. Afterwards, the photographer moves the coupled light-proof sliders back into their closed positions, whereupon the unloaded cassette 30 can be taken out of the holder 182 and later reloaded with an unexposed film sheet via the loader 140 (FIG. 27). The container 145 is left in the conventional manner in the holder 182 in order to be loaded with other exposed film sheets from the cassette 30 in the manner described.

At any arbitrary time the photographer can pull the container 145 out of the holder 182, to develop the exposed film sheet piled into the container at a later date, be that in a conventional dark room or via an automatic developer. The exposed film sheets from the container 145 can be transferred into the developer in full ambient light, if the charging opening of the developer has an adapter for light-proof attachment or insertion of the container. Said adapter can be formed, e.g. similar to the device 140 (FIG. 27), with the sole difference that the output opening 153 of the separator 150 is attached directly to the charging opening of the developer. Of course, other designs of the adapters are feasible, especially when the whole stack of exposed film sheets may be transferred all at once into the charging opening of the developer. The container 145, containing the exposed film sheets, can also be transported to a distant developing plant, which e.g. specializes in the development of color film material and develops the film sheets in the container for the photographer. The developed film sheets may be transported back via the container 145.

In a variation of the embodiment, not shown, of the unloader, according to FIG. 28, the perforation 186 of the intermediate floor 185 can be light-sealed and communicate indirectly with an entrance opening of a photographic developer, so that the detour over the container 145 is superfluous.

The aforementioned groove 133 on one of the narrow longitudinal sides of the housing 31 of the cassette 30 gives the latter an unsymmetrical shape. The apertures of the interior spaces 143 and 184 for inserting the cassette 30 and the loader and unloader, according to FIGS. 27 and 28, are preferably profiled in their adjustment to the groove 133 of the cassette 30 such that inserting the cassette incorrectly is avoided by the shape. This prevents the photographer or his aids from making manipulation errors.

Figure 29:
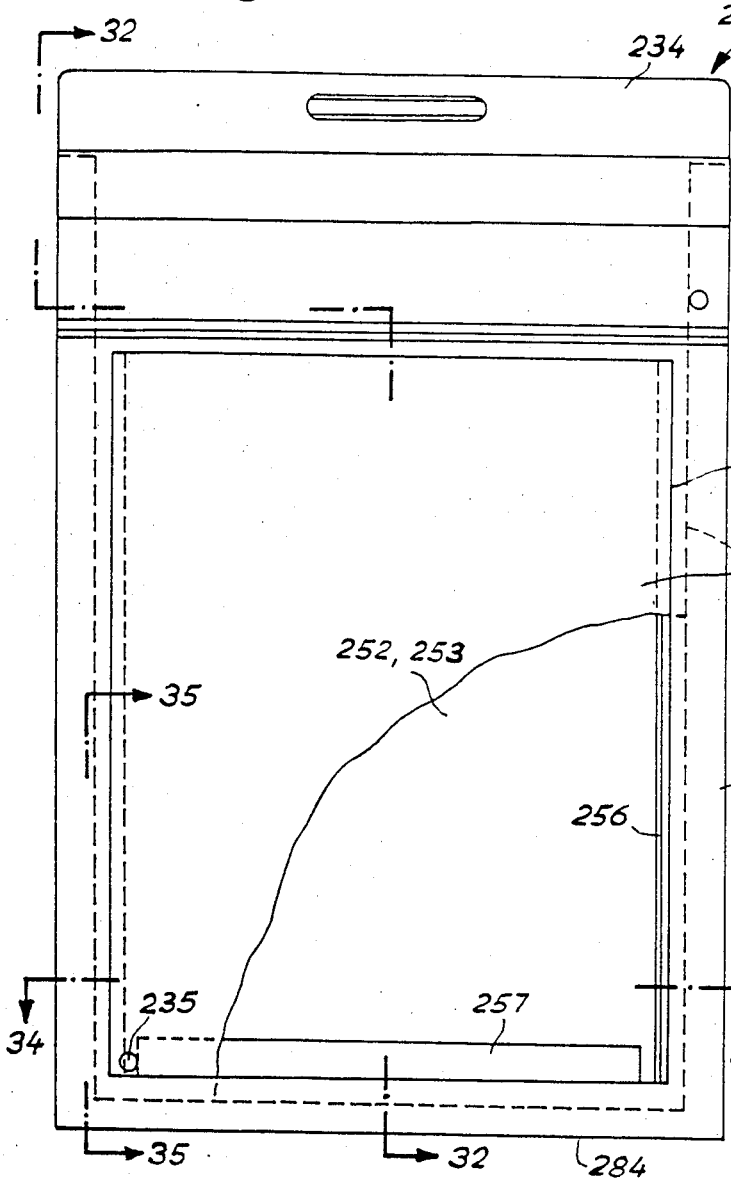
FIG. 29 is a front view showing a second examplary embodiment of the cassette of the invention with a view of the opening of the housing through which the light-sensitive sheet is loaded into the cassette and through which the light enters when the sheet is exposed, with a portion of the light-proof slider broken away.
Figure 30:
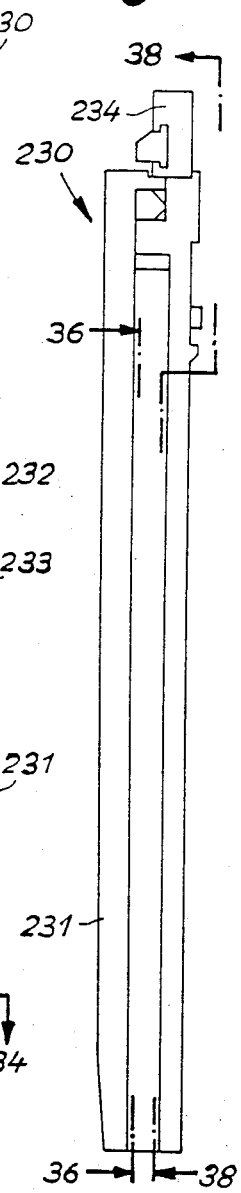
FIG. 30 is a side view of the same cassette, as seen from the left in FIG. 29.
Figure 31:
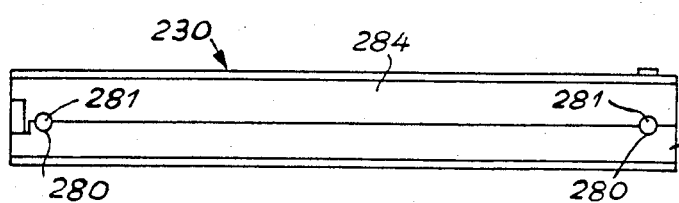
FIG. 31 is a lower front end view of the cassette housing of FIG. 29.

The second embodiment of a photographic cassette 230, which is shown in FIGS. 29 to 38, has a flat housing 231 with a right-angle opening 232 of the housing 231, according to FIGS. 29 to 31. This opening, similar to the first embodiment, permits not only the light-sensitive sheet, to be taken out of the cassette or to be loaded into the cassette, but also the light to enter when exposing the sheet as the picture is taken. A light-proof slider 233, which can be moved in the housing and which has a handle 234 to actuate the light-proof slider, is assigned to the opening 232 of the housing. On the end of the light-proof slider 233, which is opposite the handle 234, there is at least one nipple 235 (FIG. 29), which projects into the opening 232 of the housing and which prevents the light-proof slider 233 from being completely pulled out of the housing 231.

In the housing 231 there is a pressure plate 252 (FIGS. 29, 32A, 32B, 33, 35, 38A, 38B), whose front side, facing the opening 232 of the housing, forms a supporting surface 253 for the light-sensitive sheet, inserted into the cassette. The pressure plate 252 is under the influence of a leaf spring 255, which is wave shaped and which pushes the pressure plate in the direction against the opening 232 of the housing. Between the opening 232 of the housing and the pressure plate 252 there are retaining members 256 and 257 (FIGS. 29, 32B, 33 and 37), which are designed to grip the edges of the light-sensitive layer of the light-sensitive sheet, loaded into the cassette such that this sheet can be rigidly clamped under the influence of the leaf spring 255 between the retaining members 256 and 257 on the one hand and the supporting surface 253 of the pressure plate 252 on the other hand, in order to attain a planar position of the sheet at the pressure plate 252. However, in order to permit the light-sensitive sheet to pass through the opening 232 of the housing perpendicular to the plane of the sheet when loading and unloading the cassette 230, the retaining members 256 and 257 can be moved out of their effective positions into ineffective positions outside the sheet's path of motion, i.e. outside the contours of the opening 232 of the housing, and in particular exclusively parallel to the supporting surface 253 of the pressure plate 252.

The retaining members 256 are flat strips which are located at the opposing longitudinal edges of the opening 232 of the housing, the edges extending parallel to the motion path of the light-proof slider 233, as shown in in particular in FIGS. 29, 36, and 37. The third retaining member 257 is a strip which extends along the lateral edge of the opening 232 of the housing, the edge being the furthest removed from the handle 234 of the light-proof slider 233, and thus the strip is at a right angle to the light-proof slider's path of movement.

Figure 38A:
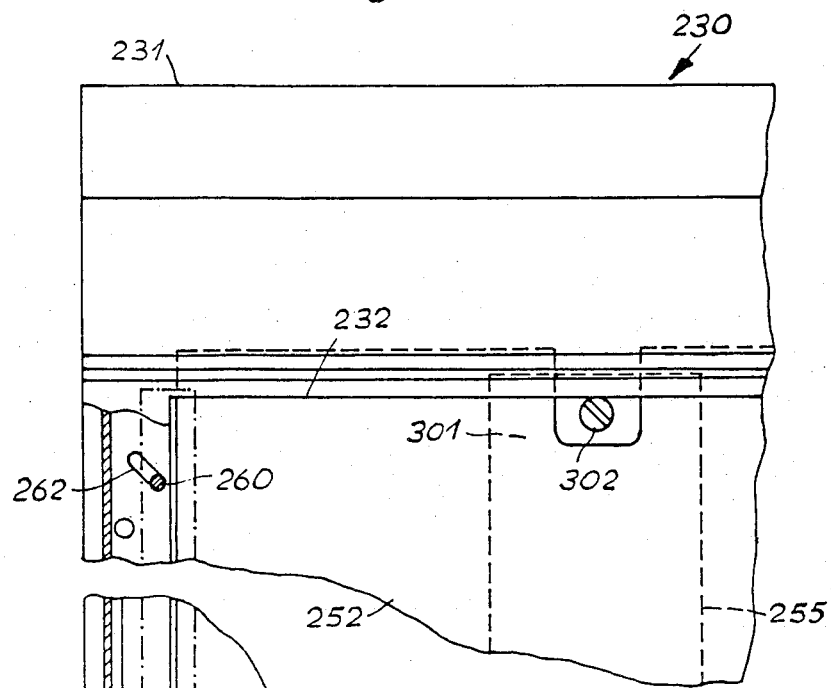
FIGS. 38A and 38B are detail sectional views taken substantially along the line 38—38 of FIG. 29, on a larger scale and along the line 38—38 of FIG. 35 on a smaller scale.
Figure 38B:
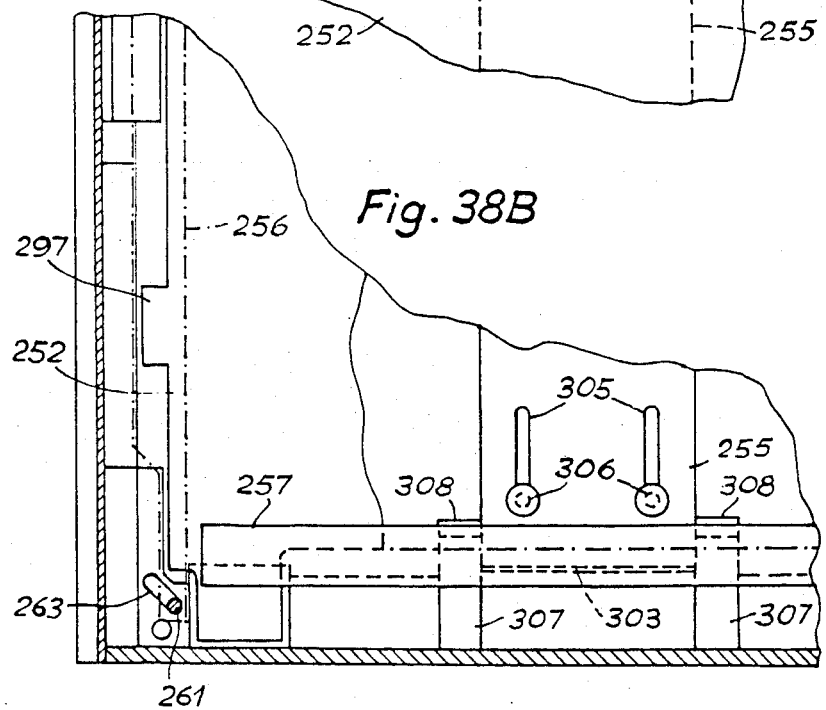

Each of the retaining members 256, assigned to the longitudinal edges of the opening 232 of the housing, as two pilot pins 260 and 261 (FIGS. 35 to 37, 38A, 38B), which engage with a guide groove 262 and/or 263, formed in the housing 231 (FIGS. 38A, 28B). Each of these guide grooves 262 and 263 has a sloping path with respect to the longitudinal direction of the retaining member 256 so that the movements of this retaining member 256 automatically have a component of movement in the longitudinal direction and a component of movement in the lateral direction. FIG. 36 shows one of the retaining members 256 in its effective position, while in FIG. 37 the same retaining member 256 is shown in its ineffective position. By exerting an upward force in the longitudinal direction of the retaining member 256 in FIG. 36, not only a component of motion upward but also at the same time a laterally directed component of motion in the direction away from the opposite retaining member 256 is issued to this retaining member. Thus the member attains its ineffective position, according to FIG. 37. If inversely, an upward force is exerted on the retaining member 256 in its longitudinal direction in FIG. 37, the retaining member moves not only downward but also at the same time transversely. Thus the member attains its effective position, according to FIG. 36.

The following described mechanisms are present for the motion drive of the retaining members 256. For the sake of simplicity, only one mechanism is shown in FIGS. 35 to 37. The mechanism for the motion drive of the opposite retaining member 256 is formed symmetrically. A rod-shaped ram 281, which can be moved in the longitudinal direction in the housing 231 and can be actuated from the outside through an associated bore 280 (FIGS. 31, 35 to 37), extends parallel to the longitudinal direction of each retaining member 256. The apertures of the bores 280 are located on the front end face 284 of the housing 231. The face is opposite the handle 234 of the light-proof slider 233. The end of each ram 281, opposite the front end face 284, is connected to a head piece 282, which is guided movable into a recess 283 of the housing 231, as shown in FIGS. 35 to 37. The ram 281 has a permanently attached slider 285, whose purpose will be explained later. The head piece 282 has a planar guide surface 288, which extends parallel to the longitudinal direction of the adjacent retaining member 256 and which is designed to interact with a control pin 289, permanently mounted to the retaining member 256. Furthermore, the head piece 282 has an inclined guide groove 290 in which the control pin 289 can enter, thus the parallel flanks of the guide groove 290 form inclined guide surfaces for interaction with the guide pin 289. A pressure spring 291 is inserted between the aforementioned slide piece 285 and an interior projection 292 of the housing 231. This pressure spring 291 tends to move the ram 281 together with the pieces 282 and 285, connected to the ram, against the front end face 284 of the housing 231 until the head piece 282 on the interior projection 292 or the slider 285 strikes against a stop face 293 of the housing. When the coupled pieces 281, 282, and 285 thus attain their rest position, the guide surface 288 of the head piece 282 is at the control pin 289 of the retaining member 256, thus locking the latter into its effective position.

If the ram 281 is moved against the influence of the pressure spring 291, according to the arrow 294 in FIG. 37, the head piece 282 is moved upward in FIGS. 36 and 37. In this manner the control pin 289 of the retaining member 265 is seized through the mouth of the inclined guide groove 290. It then slides into this guide groove, as shown in FIG. 37. The result of this is that the retaining member 256 moves out of its effective position into its ineffective position. If the force, exerted on the ram 281, according to arrow 294, is removed, the pressure spring 291 forces the ram back into its rest position, according to FIG. 36. Thus the retaining member 256 is locked again into its effective position due to the interaction of the inclined guide groove 290 of the head piece 282 with the control pin 289.

According to FIGS. 35 to 37, the aforementioned slider 285, which is rigidly connected to the ram 281, has a lateral prolongation 295 with an inclined guide surface 296. The latter is designed to interact with a laterally projecting lug 297 of the pressure plate 252, when the ram is moved. If the ram 281 is moved against the influence of the pressure spring 291, the inclined sliding surface 296 of the prolongation 295 of the slider travels against the lug 297, whereby the pressure plate 252 issues not only a component of motion parallel to the ram's 281 and the light-proof slider's path of motion but also a component of motion away from the opening 232 of the housing, i.e. to the left in FIG. 35. The result of the former component of motion is that the end 298 of the pressure plate 252, such end being closer to the handle 234 of the light-proof slider 233 (FIG. 324), engages with a stationary, inclined sliding surface 299 in the interior of the housing. In this manner the part of the pressure plate 252, such part being adjacent end 298, experiences a component of motion in the direction away from the opening 223 of the housing, as is indicated by the dash-and-dot line 252'.

Thus when actuating both rams 281 (according to the arrow 294 in FIG. 37), the pressure plate 252 is forced counter to the influence of the leaf spring 255 away from the opening 232 of the housing and retaining members 256 and 276, and in particular at times before the retaining members are moved out of their effective positions into their ineffective positions. Inversely, when withdrawing the forces, exerted on the ram 281, the pressure plate 252 is held via the slider extension 295 of each ram and via the stationary, inclined sliding surface 299 in the pushed back position until the retaining members 256 have been moved into their effective positions via the head piece 282. Not until the rams 281 assume their rest positions do the slider extensions 295 permit the pressure plate 252 to be moved under the influence of the leaf spring 255 against the retaining members 265, which are in their effective positions. In this manner the end 298 of the pressure plate 252 slides over the stationary, inclined sliding surface 299 (FIG. 32A). Thus the pressure plate also experiences a component of motion in the direction away from the handle 234 of the light-proof slider 233.

The purpose of the leaf spring 255, which is wave shaped and associated with the pressure plate 252, is to move the third retaining member 257 into its ineffective position, when both rams 281 are actuated and/or released, according to the arrow 294 in FIG. 37. For this purpose, the end 301 of the leaf spring 255, such end being closer to the handle 234 of the light-proof slider 233, is attached on the housing 232 e.g. via a screw 302 (FIGS. 32A and 38A), whereas the opposite end 303 of the leaf spring 255 is connected to a slider 304, supporting the third retaining member 257, according to FIGS. 32B and 33. In the vicinity of the latter end 303, the leaf spring 255 has two selector shaft guides 305 (FIGS. 32B, 33, 38B), through which one guide bolt 306, attached at the housing 231, passes. The selector shaft guides 305 of the leaf spring 255 run parallel to the longitudinal edge of the opening 232 of the housing. The slider 304, which supports the third retaining member 257, is guided through guide runners 307 (FIGS. 32B, 33, 34, 38B), which are designed to be stationary in the housing 231; and each runner has a projection, which serves as a stop, in order to fix the effective position of the retaining member 257.

It should be evident that at times when forcing the pressure plate 252 against the influence of the undulatory leaf spring 255, the spring experiences some stretching because then its waves are flattened out and pressed flat to a substantial degree, as is evident from FIG. 33. Since the one end 301 of the leaf spring 255 is mounted on the housing, the aforementioned stretching of the leaf spring results in its other end 303 moving in the direction against the front end face 284 of the housing 231, thus the retaining member 274 being moved out of its effective position, according to FIG. 32B, into its ineffective position, according to FIG. 33, via the slider 304 of the retaining member 257. When afterwards the pressure plate 252 is permitted to move back in the direction against the opening 232 of the housing, the leaf spring 255 resumes its original undulation under the influence of its own elasticity, whereby the third retaining member 257 is moved back into its effective position, according to FIG. 32B, via the slider 304 of the retaining member 247 and finally the pressure plate 252 is forced back against the retaining members 256 and 257, which have already been moved back into their effective positions.

According to FIGS. 32B and 33, the sider 304, supporting the third retaining member 257, has a stop face 401, which runs transversely to the retaining member's direction of motion, which is designated to push a light-sensitive sheet, which was inserted through the opening 232 of the housing into the cassette 230, along the supporting surface 253 of the pressure plate 252, which is still somewhat pushed back, in the direction of the front end face 284 of the housing 231, when the retaining member 257 is moved out of its ineffective position, according to FIG. 33, into its effective position, according to FIG. 32. Displacing the light-sensitive sheet with respect to the contours of the opening 232 of the housing results in the edge of the sheet, such edge being closer to the handle 234 of the light-proof slider 233, being moved under the transverse edge there of the opening 232 of the housing. Thus the light-sensitive sheet actuates a feeler 110 (FIG. 32A), which in the first described cassette 130 controls an indicator 112 for the load state of the cassette 230.

The other design of the cassette 230 is essentially the same as the first embodiment and described in the same manner with reference to FIGS. 4 to 9 and 23 to 26. Even the mode of operating the cassette 230 is the same as that of the first described cassette 130. Thus for loading and unloading the cassette 230, a loader 140, according to FIG. 27, and/or an unloader 180, according to FIG. 28, can also be used.

With respect to the action it should be observed that when actuating the ram 281, the movable retaining members 256 and 257 of the cassette 230 are also moved into their ineffective positions when the light-proof slider 233 still assumes its close position, against which in the first described cassette 130, following the actuation of the ram 81, the retaining members 56 and 57 respectively persist in their effective positions until the light-proof slider 33 is closed, and do not assume under the influence of the pressure springs 91 their ineffective positions until the light-proof slider 33 is completely open. This functional difference is unimportant for the practical application of cassettes 130 and 230. In both cases, when the ram 81 or 281 is actuated, the pressure plate 52 or 252 is pushed, first of all, counter to the influence of the leaf springs 55 or the leaf spring 255 away from the retaining members 56 and 57 or 256 and 257, which are in their effective positions, before the retaining members are moved into their ineffective positions. And vice versa when the ram 81 or 281 respectively is released, the retaining members are first moved out of their ineffective positions into the effective positions, before the pressure plate 52 or 252 is forced by means of the leaf springs 55 or the leaf spring 255 against the retaining members. Thus the motion of the retaining members 56 and 57 or 256 and 257 always occurs in the unloaded condition.

The position of the light-sensitive layer of the film sheet, loaded into the cassette 30 or 230, is defined by the retaining members 56, 57 or 256 and 257, moved into their effective positions, when the pressure plate 52 or 252 forces the film sheet against the retaining members under the influence of the leaf spring 55 or the leaf spring 255. Consequently different thicknesses of film sheets that might be used have no influence on the position of the light-sensitive layer and on the resolution of the pictures, produced using this cassette.

In FIGS. 39 to 44 another advantageous design of the second embodiment, described with reference to FIGS. 29 to 38, is shown as a third embodiment of the cassette of the invention. Similar elements have the same reference numerals as in FIGS. 29 to 38. In the following only the differences with respect to the earlier embodiment are described.

Figure 39:
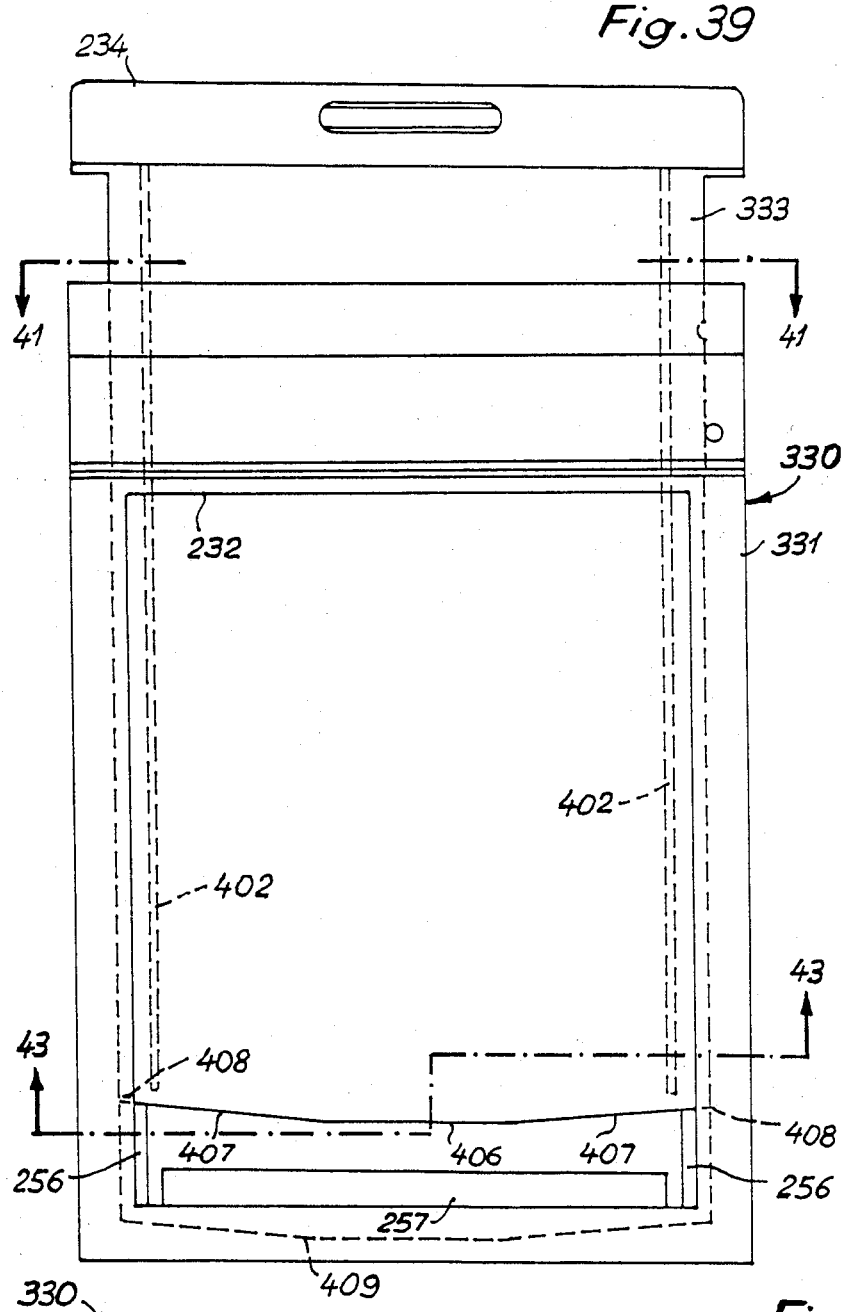
FIG. 39 is a front view a third examplary embodiment of the cassette of the invention, in particular a version of the design of FIGS. 29 to 38, with a view of the opening of the housing with the light-proof slider slightly opened.
Figure 40:
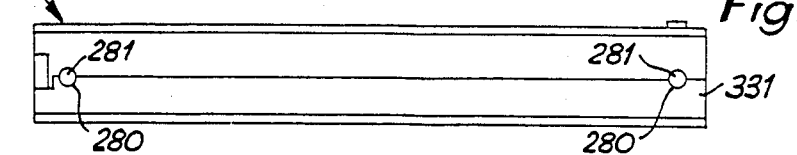
FIG. 40 is a lower end view of the cassette housing of FIG. 39.
Figure 41:
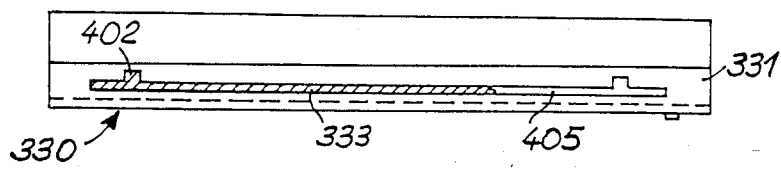
FIG. 41 is a sectional view taken substantially along the line 41—41 of FIG. 39 with a portion of the light-proof slider shown broken away.
Figure 42:
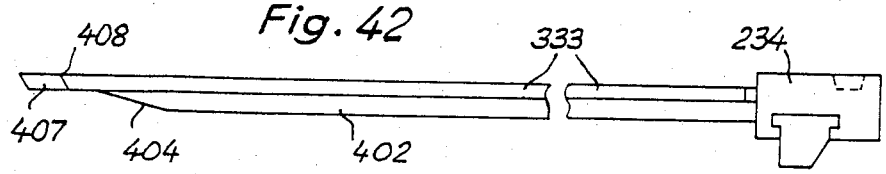
FIG. 42 is a side view of the light-proof slider of the cassette, according to FIGS. 39 to 41, on a larger scale.
Figure 43:
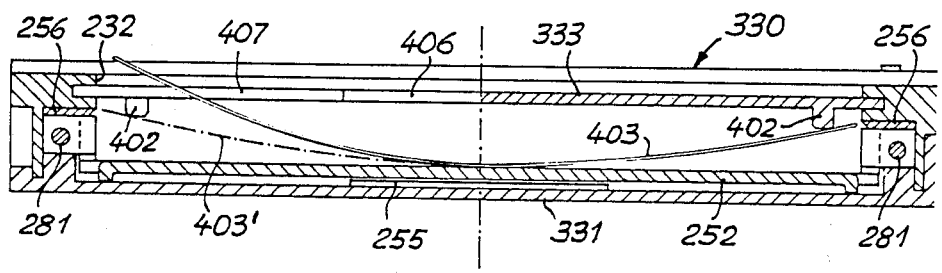
FIG. 43 is a cross-sectional view taken substantially along the line 43—43 of FIG. 39, on a larger scale, while loading the cassette with a light-sensitive sheet.
Figure 44:
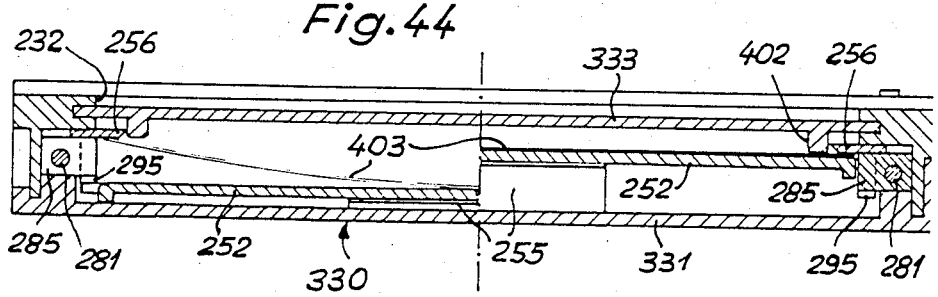
FIG. 44 is a cross-sectional view similar to that of FIG. 43 showing the cassette in a loaded state when the light-proof slider is completely closed, and in particular on the left when the pressure plate is still pushed back and on the right when the pressure plate is released.

According to FIGS. 39 to 44, the cassette 330 has a light-proof slider 333, which is provided with two projecting ribs or runners 402 on its sides, facing in the closed position the interior of the housing 331. These runners 402 extend parallel to the path of motion of the light-proof slider 333 and extend from the handle 234 of the same up to the vicinity of the opposite end of the light-proof slider. FIGS. 39 and 41, and still clearer FIGS. 43 and 44, show that each part of the runners 402 extend at relatively negligible distances from one or the other longitudinal edge of the light-proof slider 33, and in particular in such a manner that when the ligh-proof slider is closed, the runners 402 are not yet contacted by the lateral retaining members 256, when the latter are in their effective positions, according to FIGS. 39 and 44. The height of the runners 402, measured perpendicular to the planar interior of the light-proof slider 33, is restricted such that, when the light-proof slider 333 is closed, the runners 402 do not yet contact a light-sensitive sheet 403, loaded into the cassette, when under the influence of the pressure spring 255, the sheet is forced via the the pressure plate 252 against the retaining members 256, moved into their effective positions, as shown in the right half of FIG. 44. According to FIG. 42, each part of the runners 402 has an inclined, rising ramp 404 at its end, opposite the handle 234 of the light-proof slider 333. It is evident that the recess 405 (FIG. 41), which is required for the entrance of the light-proof slider 333, in the end of the housing 331, the end facing the handle 234, is adapted to the profile of the light-proof slider 33 and the runners 402 in order to prevent the light from penetrating into the interior of the housing 331.

In FIG. 39 it is clear that on the end, opposite the handle 234, the light-proof sider 333 has an end edge, which does not extend in a straight line. Only middle section 406 of the end edge extends at a right angle to the path of movement of the light-proof slider 333, whereas each of the adjacent sections 407 of the end edge is inclined, such that the corners 408 of each section 406, 407 is at a somewhat shorter distance from the handle 234 than the middle section 406. In the housing 331, the recess 409, which is indicated by the dashed line in FIG. 39, conforms in shape with the end edge 406, 407 of the light-proof slider 333. In the recess the end part of the light-proof slider, which is opposite the handle 234, must engage in the closed position of the slider so that one knows with certainty at this point that no light will penetrate into the interior of the housing 331 when the light-proof slider is closed.

In comparison to the aforementioned first and second embodiments, the described features of the third embodiment, according to FIGS. 39 to 44, offer the advantage that even non-planar light-sensitive sheets can be loaded with certainty and faultlessly into the cassette 330, in particular with the aid of a semi-automatic device, according to FIG. 27. In practice experience has shown that e.g. so-called sheet films have the tendency to curve concavely toward the side of their light-sensitive layer, and in particular, around an imaginary axis, which extends parallel to the longer edges of the right-angle sheets. The result of these phenomena, which have essentially been observed in all formats and brands of light-sensitive sheets, is that a light-sensitive sheet 403, to be loaded into the cassette when the light-proof slider is open, as shown in the left half of FIG. 43, rests on the pressure plate 252 only with the middle part of its back side, which is opposed to the light-sensitive layer, whereas the longitudinal parts of the sheet 403 still projects out of the interior of the housing 331, even when the pressure plate 252 is forced back counter to the influence of the pressure spring 252 by actuating the rams 281, as was explained with reference to the second embodiment, according to FIGS. 29 to 38.

If now the light-proof slider 333 of the cassette 330, described above, is moved from its open position into the closed position, the central section 406 of the end edge 406, 407 of the light-sensitive slider travels between the turned up lateral edges of the sheet 403, whereupon this edge is forced, via the inclined outer sections 407 thereof, somewhat in the manner of a snow plow upwardly and against the pressure plate 252 until the entire end edge 406, 407 can slide away over the sheet 403. Immediately following, the inclined rising ramps 404 and the runners 402 make contact with the concave side of the sheet 403. Thus the latter is pressed flat by the runners 402, as indicated in the left half of FIG. 43 with a dash-and-dot line 403' and is shown solid outline in the right half of FIG. 43. In closing the light-proof slider 333, each longitudinal edge of the sheet 403 is forced into such a position that afterwards the lateral retaining members 256, as well as the third retaining member 257 (FIG. 39), can extend over the adjacent edges of sheet 403 when the retaining members 256 and 257 are moved back into their effective positions, according to FIGS. 39 and 44.

In the left half of FIG. 44, an intermediate phase is shown during the movement of the ram 281 from its active position back into its inactive position. The lateral retaining members 256 are already in their effective positions in which they grip the adjacent edges of the sheet 403, inserted into the cassette, while the pressure plate 252 is forced back counter to the influence of the pressure spring 255 via the extension 295 of the slider 285, which is connected to the ram. The right half of FIG. 44 shows finally the end phase of the loaded cassette: The ram 281 and the slider 285, connected thereto, are in the inactive rest position in which the extension 295 of the slider 285 has released the pressure plate 252 so that the latter presses under the influence of the pressure spring 255 the edges of the light-sensitive sheet 403 against the retaining members 256 and 257. In this manner the light-sensitive surface of the sheet 403 is held almost completely planar in a pre-determined plane, defined by the retaining members 256 and 257.

As stated, the device 140 can be used to great advantage when semi-automatically loading the cassette 330, described above. Thus when inserting the cassette into the holder 142, both rams 281 are moved automatically into their active positions via the stationary feelers 85. And thus the pressure plate 252 is forced back against the influence of the pressure spring 255, and the retaining members 256 and 257 are moved into their ineffective positions, according to FIG. 43. When the loaded cassette is removed from the holder 143, the rams 281 automatically return into their inactive rest positions under the influence of the pressure springs 291, assigned to them (FIGS. 35 and 37). Thus, according to FIG. 44, the retaining members 256 and 257 assume their effective positions and the pressure plate 252 is released in order to press the edges of the loaded sheet 403 against the retaining members 256 and 257.

What is claimed is:

1. Photographic cassette for use and exposure of a light-sensitive sheet, for application in a large format camera, comprising a flat rectangular housing for the reception of the light-sensitive sheet; the housing having an opening; a flat light-proof slider, movable within the housing, for opening or light-seal closing the opening; the light-proof slider having an actuating end and a path of movement parallel to its flat faces, said opening conforming in shape and size to the light-sensitive surface of the sheet and permitting not only the light to enter when exposing the sheet but also the sheet to pass there-through when loading and unloading the cassette in a direction perpendicular to the sheet; a supporting surface in the housing for bracing the back side of the sheet opposite the light-sensitive front side thereof; and a plurality of retaining members in the housing for gripping the edges of the light-sensitive front side of the sheet; at least some of said retaining members being movable into operative and inoperative positions and, for loading and unloading the cassette, are moved out of their operative positions into their inoperative positions outside a path of motion, required for the light-sensitive sheet as the cassette is loaded or unloaded; at least one externally accessible actuator for interacting with the retaining members and being movable between an inactive position in which the retaining members are moved into their operative positions, and an active position in which the retaining members are moved into their inoperative positions, wherein a pressure plate contains the supporting surface, the plate being under the spring bias of at least one pressure spring which urges the pressure plate in a direction against the opening of the housing for clamping the light-sensitive sheet between the supporting surface of the pressure plate and the retaining members moved into their operative positions; and wherein the actuator for moving the retaining members is connected to a controller interacting with the pressure plate such that each movement of the actuator into its active position also results in the pressure plate being forced back against the influence of the pressure spring in order to provide a free space between the supporting surface of the pressure plate and the retaining members.

2. Cassette, according to claim 1, further comprising means for preventing the retaining members from assuming their inoperative positions until the pressure plate is forced back against the influence of the pressure spring, when the actuator moves into its active position, and said means holding the pressure plate in its forced back position until the retaining members are moved into their operative positions when moving the actuator into its active position.

3. Cassette, according to claim 2, further comprising a spring for moving the actuator into its active position and thereby moving the retaining members into their operative positions and releasing the pressure plate for its movement under the influence of the pressure spring.

4. Cassette, according to claim 3, wherein the housing has a recess for the reception of the actuator which is movable parallel to the path of movement of the light-proof slider.

5. Cassette, according to claim 4, wherein an opposed pair of the movable retaining members comprise strips extending parallel to the path of movement of the light-proof slider and are located at opposed edges of the opening of the housing; guide members for automatically guiding each of said opposed retaining members such that the movement thereof into the inoperative position exhibits a component of motion in its longitudinal direction and a component of motion in a transverse direction away from the opposite retaining member; and the actuator being connected to a controller having at least one inclined guiding surface for interaction with a controller located on one of said retaining members in order to impart to said retaining member the two aforementioned components of motion.

6. Cassette, according to claim 5, wherein a pair of actuators are provided, one for each of the retaining members.

7. Cassette, according to claim 6, wherein the controller, interacting with the pressure plate, has an inclined sliding surface, which in interaction with the pressure plate results not only in the adjacent part of the pressure plate being forced back against the influence of the pressure spring but also results in the pressure plate being displaced in a direction parallel to the path of movement of the light-proof slider when the actuator is moved into its active position; and wherein in the housing at least one stationary inclined sliding surface interacts with one part of the pressure plate, said part being removed from the controller so that the result of the pressure plate being displaced is also at times that the removed part of the pressure plate is forced back against the influence of the pressure spring.

8. Cassette, according to claim 2, wherein the actuator is operationally coupled through the intermediary of a spring, and wherein there is at least one locking member which interacts with the light-proof slider, and which, with the movable actuator in its active position forces the retaining members form-locking into their operative positions and locks positively counter to movement into their operative positions when the light-proof slider is not moved into an open position in which the opening of the housing is open.

9. Cassette, according to claim 5, wherein a third of the movable retaining members comprises a strip extending at a right angle to the path of movement of the light-proof slider and is arranged at a transverse edge of the opening of the housing, said transverse edge being most distant from the actuating end of the light-proof slider, wherein said third retaining member is operationally coupled by means of a pivotable layer to the pair of retaining members such that each component of motion of one of said pair of retaining members in its longitudinal direction results automatically in the third retaining member moving in opposite direction.

10. Cassette, according to claim 5, wherein a third of the movable retaining members comprises a strip extending at a right angle to the path of movement of the light-proof slider and is arranged at a transverse edge of the opening of the housing; said transverse edge being most distant from the actuating end of the light-proof slider; wherein the pressure spring for the pressure plate comprising an undulatory leaf spring extending essentially parallel to the path of movement of the light-proof slider; and wherein the third retaining member is guided movable in a direction parallel to the path of movement of the light-proof slider and is connected to one end of the undulatory leaf spring such that in forcing the pressure plate against the influence of the pressure spring, the latter experiences a stretching, which results in the undulatory leaf spring being flattened, and thus imparts to said third retaining member a movement into its inoperative position.

11. Cassette, according to claim 9 or 10, wherein the third retaining member has a stop face for interacting with an edge of a light-sensitive sheet, when inserted in the housing, in order to move the sheet under another transverse edge of the opening of the housing when said retaining member moves into its operative position; said other transverse edge being less distant from the actuating end of the light-proof slider.

12. Cassette, according to claim 11, wherein on the other transverse edge of the opening of the housing, there is at least one stationary stop face, facing the supporting surface of the pressure plate, and an inclined guide surface, leading to said stop face, for a light-sensitive sheet inserted into the housing and displaced by means of said third retaining member.

13. Cassette, according to claim 1, wherein the light-proof slider has on its side facing the interior of the housing at least two runners extending parallel to the path of movement of the light-proof slider and an inclined rising ramp at each end thereof opposite the actuating end of the light-proof slider such that by moving the light-proof slider into its closed position a light-sensitive sheet, when inserted into the housing, can be forced via the ramps and runners of the light-proof slider into a position such that the retaining members can thereafter grip the adjacent edges of the light-sensitive sheet, as said retaining members are moved into their operative positions.

14. Cassette, according to claim 13, wherein on its end opposite the actuating end, the light-proof slider has an end edge which deviates from a straight-line and forms end corners lying at a shorter distance from the actuating end of the light-proof slider than a central section of the end edge.

15. Cassette, according to claim 11, wherein in the housing there is a feeler under the influence of a biasing spring; said feeler being actuatable by a light-sensitive sheet inserted and moved by means of the third retaining member, and is connected to an indicator, which is externally visible in order to indicate visually whether the cassette is or is not loaded with a light-sensitive sheet.

16. Cassette, according to 1, wherein in the housing there is a bolt, movable transversely to the path of motion of the light-proof slider, said bolt being movable under the influence of an assigned spring into an operative locking position in which a part of the bolt projects out of the housing, in order to prevent the cassette from being attached to a camera or to a cassette loader, or movable against the influence of the spring into an inoperative dislocking position in which said bolt does not prevent the cassette from being attached to a camera or a cassette loader, and wherein the bolt can be locked in its inoperative dislocking position by means of a latch, which is forced by means of the light-proof slider into a position, releasing the bolt, when the light-proof slider is not in its closed position.

17. Cassette, according to claim 16, wherein the bolt has a stop face, which in the operative locking position of the bolt, prevents the latch from returning into its lock position, when the light-proof slider is moved back into its closed position, and wherein the latch is connected to an indicator, which is externally visible, to indicate visually whether the light-proof slider had been previously opened in order to expose a light-sensitive sheet, inserted into the housing.

18. Cassette, according to claim 1, wherein the light-proof slider has on its actuating end a strip, which extends in the direction of the width of the light-proof slider, along said strip there being a row of emulsion data fields, and wherein at least one of the emulsion data fields is marked in order to designate a given emulsion data.

19. Cassette, according to claim 18, wherein on the strip there is the selector, which can be adjusted along a row of the emulsion data fields, and which can be focused on any one of the emulsion data field in order to designate the given emulsion data.

20. Cassette, according to claim 1, wherein, viewed from the direction of the path of movement of the light-proof slider, the housing has an unsymmetrical shape, defined by a longitudinal groove on one narrow longitudinal side of the housing.

21. Cassette, according to claim 1, having associated thereto a device for loading or unloading the cassette, the device comprising a cassette holder having at least one stationary feeler which automatically engages with the actuator of the cassette when being inserted in order to move the actuator into its active position.

22. Cassette, according to claim 21, wherein said device is arranged for loading the cassette, the holder having a separator with a lower output opening and a light-sealed storage space for the acceptance of a stack of several light-sensitive sheets of uniform shape and size, said separator being designed to separate a single sheet fromt he stack in the storage space and to transfer the separated sheet into the output opening, which is adapted with respect to shape and size to the surface dimensions of a single light-sensitive sheet, another light-proof slider being movable into a closed position in which the output opening is light-sealed, and into an open position in which the output opening is completely opened; wherein with the cassette, inserted into the holder, the output opening of the separator conforms to the opening of the housing of the cassette and communicates with a light-seal against ambient light, when the light-proof sliders are moved into their open position to facilitate the transfer of the light-sensitive sheet from the separator into the cassette in a direction perpendicular to the sheet, and wherein the cassette and the holder are shaped to match one another in such a manenr that an incorrect insertion of the cassette, where the opening of the housing would face away from the separator, is positively prevented.

23. Cassette, according to claim 22, wherein when the cassette is inserted into the holder, the light-proof sliders lie parallel to one another and can be moved equidirectionally into their open and closed positions, and wherein both light-proof sliders have handles, which are coupled together to facilitate movement of both light-proof sliders together.

24. Cassette, according to claim 21, wherein said device is arranged for unloading the cassette, the holder having a receiving chamber for the reception of at least one light-sensitive sheet and has an entrance opening, leading to the receiving chamber, said entrance opening conforming to the shape and size of the surface dimensions of a single light-sensitive sheet, wherein another light-proof slider is movable into a closed light-sealed position relevant to the entrance opening, and is movable into an open position in which the entrance opening is completely opened; wherein when the cassette is inserted into the holder, the opening of the housing of said cassette conforms with the entrance opening of the holder and communicates with a light-seal against ambient light, when the light-proof sliders are moved into their open positions; and wherein the cassette and the holder are shaped to match one another in such a manner that an incorrect insertion of the cassette, where the opening of the housing would face away from the entrance opening of the holder, is positively prevented.

25. Cassette, according to claim 22, wherein the light-proof sliders are parallel to one another and can be moved equidirectionally into their open and closed positions; and wherein both light-proof sliders have handles which can be coupled together to facilitate movement of both light-proof sliders together.

* * * * *